June 10, 1952 H. G. WATSON 2,600,144

REMOTE CONTROLLED PLURAL REGISTERING APPARATUS

Filed April 16, 1948 19 Sheets-Sheet 1

Inventor:
Henry George Watson
by Pennie, Edmonds, Morton and Barrows
Attorneys

June 10, 1952 H. G. WATSON 2,600,144

REMOTE CONTROLLED PLURAL REGISTERING APPARATUS

Filed April 16, 1948 19 Sheets-Sheet 2

Inventor:
Henry George Watson
by Pennie, Edmonds, Morton and Barrows
Attorneys

REMOTE CONTROLLED PLURAL REGISTERING APPARATUS

Filed April 16, 1948

Inventor:
Henry George Watson
by
Pennie, Edmonds, Morton and Barrows
Attorneys

June 10, 1952 H. G. WATSON 2,600,144

REMOTE CONTROLLED PLURAL REGISTERING APPARATUS

Filed April 16, 1948 19 Sheets-Sheet 4

Inventor:
Henry George Watson
by Pennie, Edmonds, Morton and Barrows
Attorneys

June 10, 1952 H. G. WATSON 2,600,144

REMOTE CONTROLLED PLURAL REGISTERING APPARATUS

Filed April 16, 1948 19 Sheets-Sheet 5

Inventor:
Henry George Watson
by
Pennie, Edmonds, Morton and Barrows
Attorneys

Inventor:
Henry George Watson
by Pennie, Edmonds, Morton and Barrows
Attorneys

REMOTE CONTROLLED PLURAL REGISTERING APPARATUS

Filed April 16, 1948 19 Sheets-Sheet 7

Inventor:
Henry George Watson
by
Pennie, Edmonds, Morton and Barrows
Attorneys

REMOTE CONTROLLED PLURAL REGISTERING APPARATUS

Filed April 16, 1948

Inventor
Henry George Watson
by
Pennie, Edmonds, Morton and Barrows
Attorneys

REMOTE CONTROLLED PLURAL REGISTERING APPARATUS

Inventor:
Henry George Watson
by
Pennie, Edmonds, Morton and Barrows
Attorneys

REMOTE CONTROLLED PLURAL REGISTERING APPARATUS

Inventor:
Henry George Watson
by
Pennie, Edmonds, Morton and Barrows
Attorneys

Inventor:
Henry George Watson
by Pennie, Edmonds, Morton and Barrows
Attorneys

June 10, 1952 H. G. WATSON 2,600,144

REMOTE CONTROLLED PLURAL REGISTERING APPARATUS

Filed April 16, 1948 19 Sheets-Sheet 12

Inventor:
Henry George Watson
by
Pennie, Edmonds, Morton and Barrows
Attorneys

Inventor:
Henry George Watson
by
Pennie, Edmonds, Morton and Barrows
Attorneys

Inventor:
Henry George Watson
by
Pennie, Edmonds, Morton and Barrows
Attorneys

Inventor:
Henry George Watson
by Pennie, Edmonds, Morton and Barrows
Attorneys

REMOTE CONTROLLED PLURAL REGISTERING APPARATUS

Filed April 16, 1948

Inventor:
Henry George Watson
by
Pennie, Edmonds, Morton and Barrows
Attorneys

Inventor:
Henry George Watson
by
Pennie, Edmonds, Morton and Barrows
Attorneys

Inventor:
Henry George Watson
by Pennie, Edmonds, Morton and Barrows
attorneys

REMOTE CONTROLLED PLURAL REGISTERING APPARATUS

Filed April 16, 1948 19 Sheets-Sheet 19

INVENTOR
HENRY GEORGE WATSON
BY
Pennie, Edmonds, Morton, Barrows and Taylor
ATTORNEYS Patented June 10, 1952 2,600,144

UNITED STATES PATENT OFFICE 2,600,144

REMOTE-CONTROLLED PLURAL REGISTERING APPARATUS

Henry George Watson, Camberwell, Victoria, Australia, assignor to Stocklock Proprietary Limited, Melbourne, Victoria, Australia, a company incorporated in Victoria, Australia Application April 16, 1948, Serial No. 21,438
In Australia July 9, 1947

4 Claims. (Cl. 235—61)

This invention relates to apparatus for indicating and/or recording changes in value or quantity of a plurality of separate items and has been devised primarily to enable an up-to-date record to be maintained of the movements of goods into and out of a store or the like but is capable of other useful applications.

It is a matter of common experience that difficulty is experienced in maintaining a sufficiently up-to-date record of the quantities of each of a large number of different kinds of goods, held in a store or otherwise under the control of a trader when as is commonly the case the number of daily transactions by way of additions to and subtraction from the quantities on hand are comparatively large in number and concern a substantial number of different items.

Accordingly the general object of this invention is to provide apparatus by means of which a continuous record of transactions such as those mentioned above may be readily maintained.

An important subsidiary object of the invention is to provide apparatus for the stated purpose and which, having regard to the nature and magnitude of the operations to be performed thereby is not unduly expensive.

A further object is to provide apparatus for purposes of the kind described and adapted for remote control.

Another object is to provide apparatus which is simple to control and operate.

Yet another object is to provide means for printing a record of each transaction.

Still another object is to provide means whereby a plurality of indicating devices may be individually controlled from a plurality of separate positions.

With the foregoing and other objects in view, one broad feature of the invention resides in apparatus comprising a plurality of individually operable indicating means, common actuating means adapted for alternative driving engagement with any of said indicating means, means operable to effect coacting driving engagement between said actuating means and any required indicating means and means operable to actuate any indicating means so engaged by the actuating means.

A salient feature of the invention resides in the provision of transmitting means adapted to control said actuating means electromagnetically whereby said transmitting means may be arranged at a position remote from the actuating means.

Preferably the said indicating means are supported in suitable fixed positions and said actuating means is movable into register with any of said indicating means.

For this purpose the said indicating means are preferably mounted on a common support and arranged in columns and rows disposed mutually at right angles and said actuating means is supported for independent movements in directions parallel to said columns and rows.

An important feature of the invention resides in selecting any desired indicating means by energising two electromagnets, one of which corresponds to the row containing such indicating means, while the other corresponds to the column containing same, and in utilising said energised magnets to cause the corresponding movements of the actuating means to be arrested when moving in either direction it reaches position corresponding to said energised magnets.

The said magnets are selected and energised by the operation of two corresponding switches, one for the said rows and the other for said columns, and which preferably are returned automatically to fixed inoperative positions at the conclusion of each operation of the apparatus. All of said magnets which intervene between positions which correspond to such fixed positions and the magnets selected are preferably energised in succession during the forward and return movements of the said switch members for the purposes hereinafter described.

Means associated with said switches are also preferably provided for causing said actuating means to be moved in the required direction or directions when each switch member completes its forward or selecting movements.

The apparatus also includes switching means operable at the termination of certain stages of the operation of the apparatus to initiate ensuing operations and thereby ensure that such operations are effected in predetermined order.

Each of said indicating means preferably comprises a counting device having a plurality of independently adjustable members which normally are operable only by said actuating means.

The said counting devices may be adapted to record ordinary arithmetical quantities or other desired quantities or values, such for example as monetary values in any required monetary system, weights and measures or the like.

The said transmitting means incorporate means for selecting any particular indicating device to be operated by said movable actuating means, and means for predetermining values to be added to or substracted from the selected indicating devices.

The apparatus also includes transfer means for recording signals received from said transmitting means and for subsequently effecting operation of said common actuating device in conformity with such signals.

Another feature of the invention resides in the provision on said common actuating means of switch means operable by corresponding elements of a counting device engaged thereby to effect the transfer of values from the different denominational numbers of said counting device to those of the next higher denomination said switching means being arranged in circuit with the said transfer means.

The invention also includes in combination a plurality of groups of indicating means each group arranged as aforesaid, a common actuating device individual to each said group and means operable from the said transmitting means to select and effect operation of any particular actuating device and any required indicating means associated therewith.

Likewise a plurality of said transmitting means may be provided to control the operation of said common actuating device or any one of a plurality of such actuating devices, interlocking means being provided whereby only one of said transmitting means at a time may be operatively connected to any particular one of said actuating devices.

Further objects and features of the invention are set forth in the ensuing more particular description of the invention.

In the drawings which show the preferred construction of apparatus according to the invention:

Figure 13 is a view in front elevation of the common actuator for the counting devices;

Figure 37:
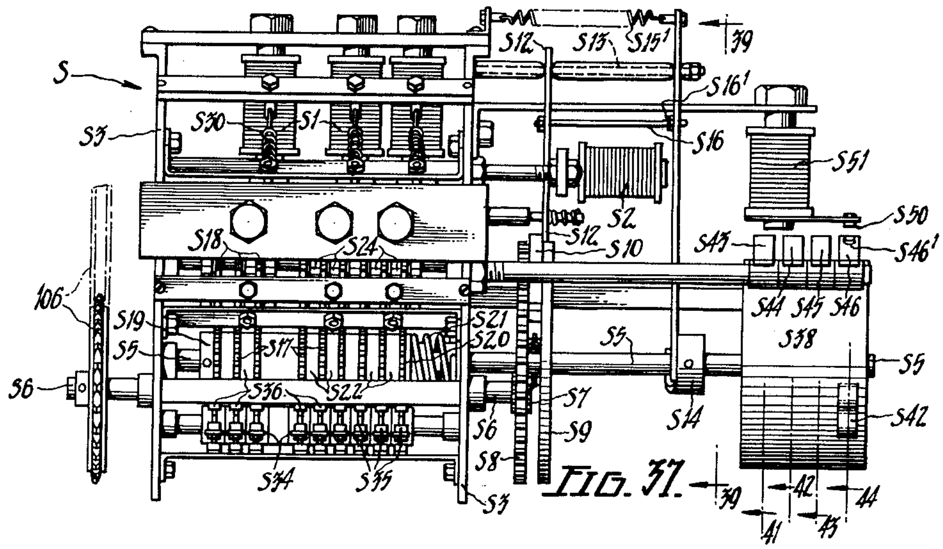
Figure 37 is a view in side elevation of the transfer mechanism.
Figure 38:
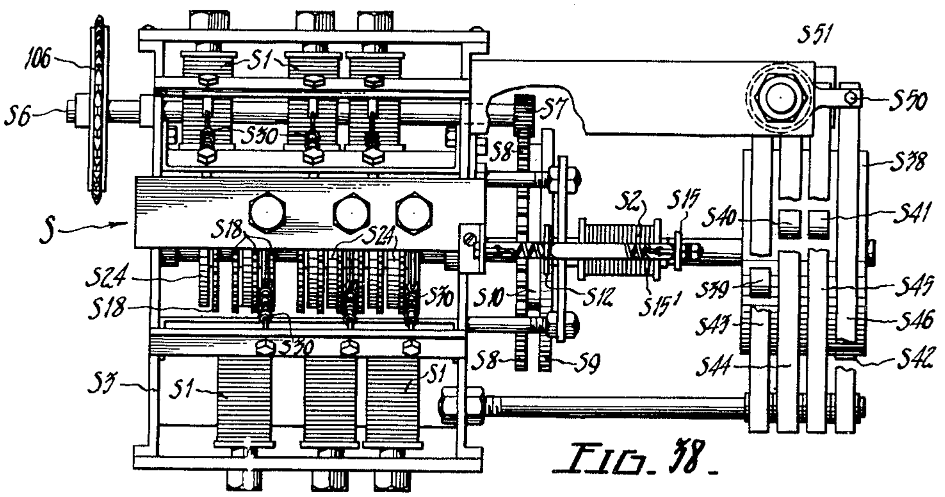
Figure 38 is a view in plan of the transfer mechanism.
Figure 39:
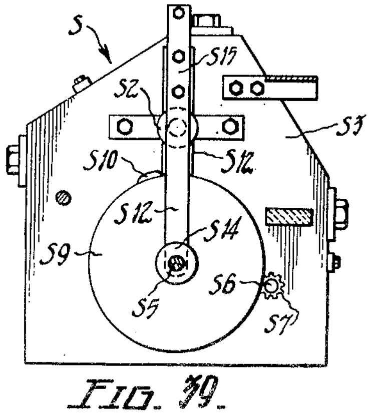
Figure 39 is a view in sectional end elevation taken on the line 39—39 of Figure 37.
Figure 40:
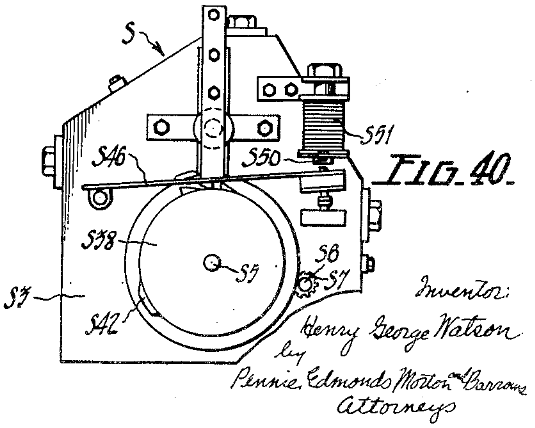
Figure 40 is a view in end elevation of the transfer mechanism.
Figure 45:
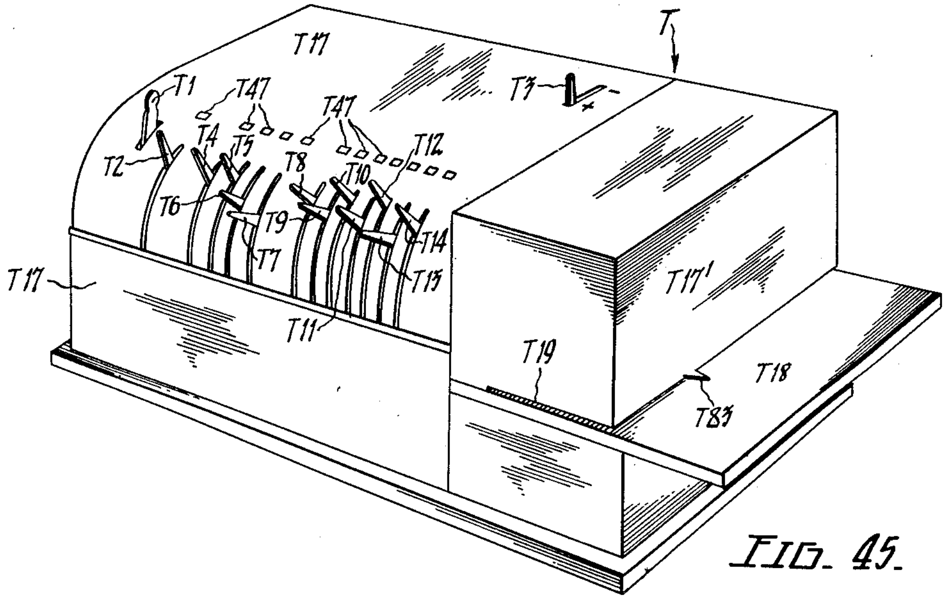
Figure 46:
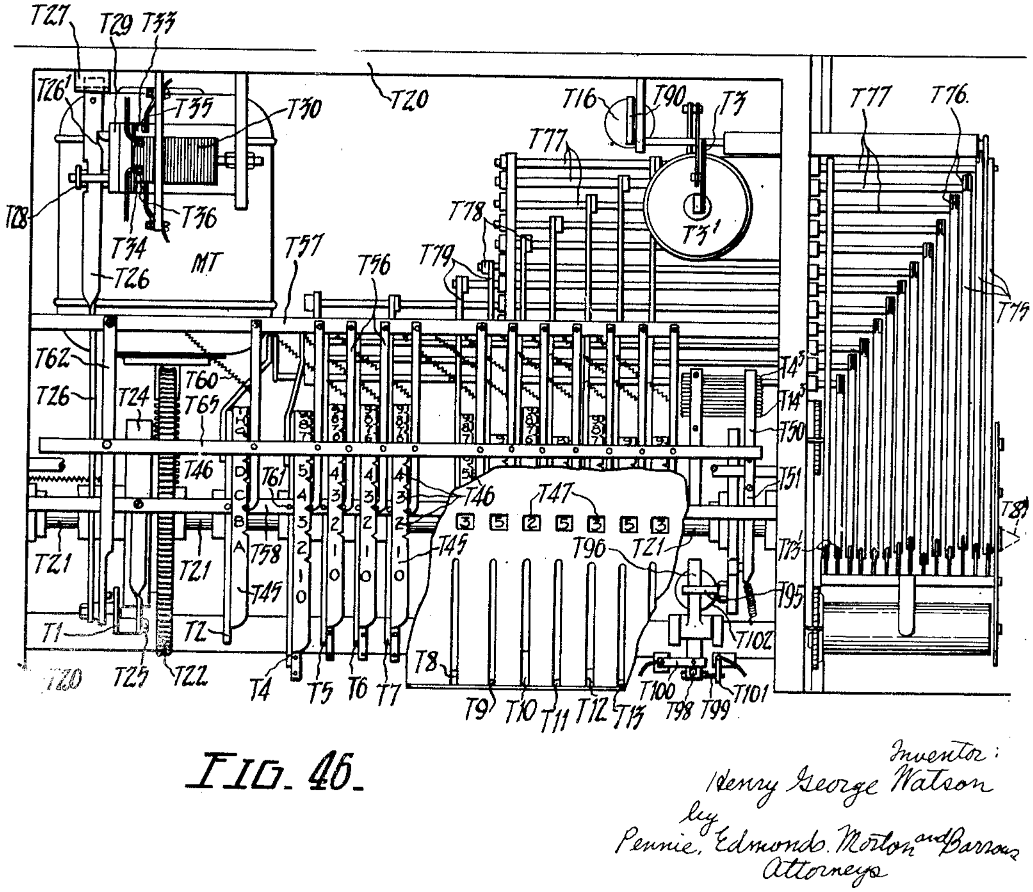
Figures 47, 48:
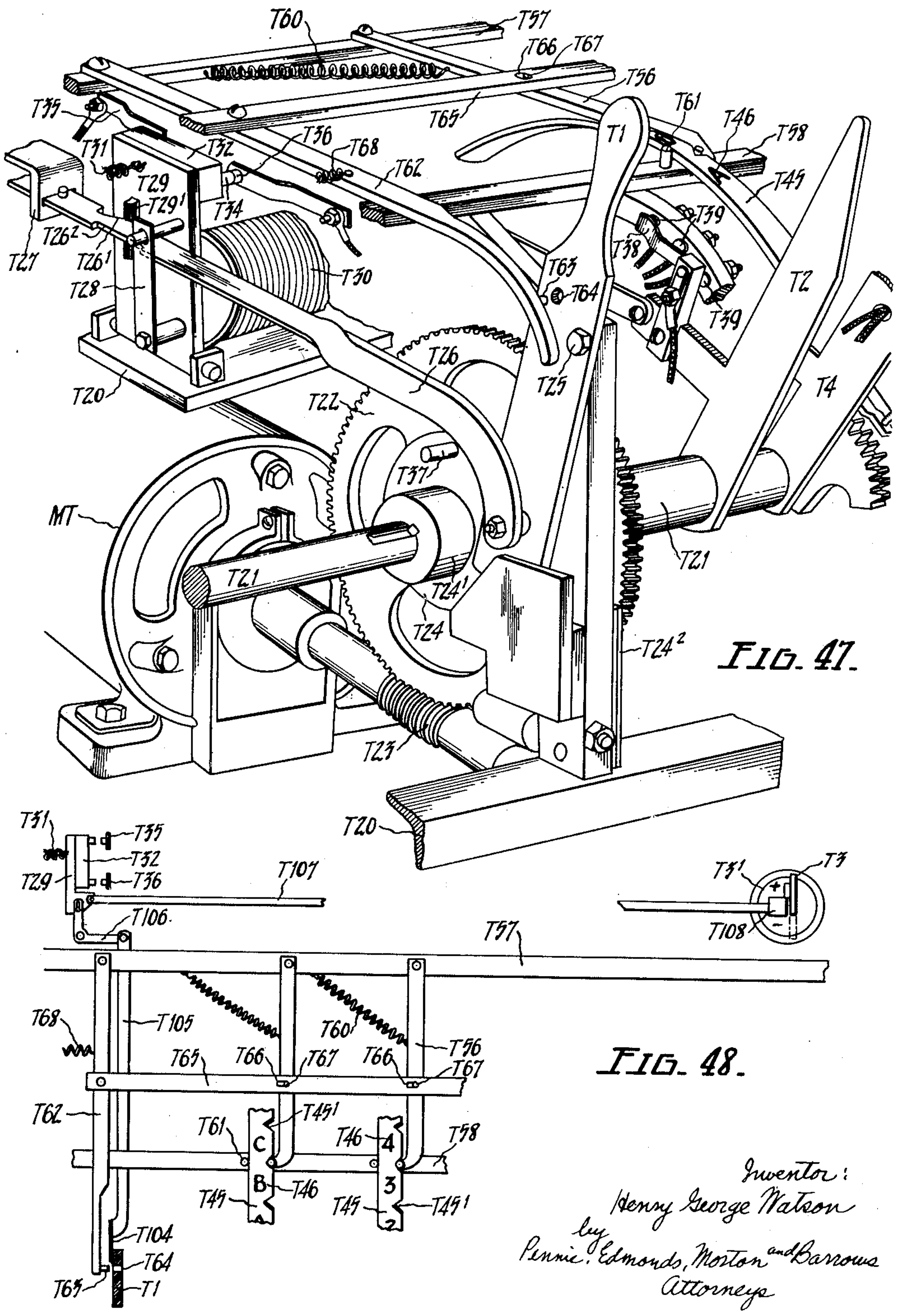
Figures 49, 50, 51, 56:
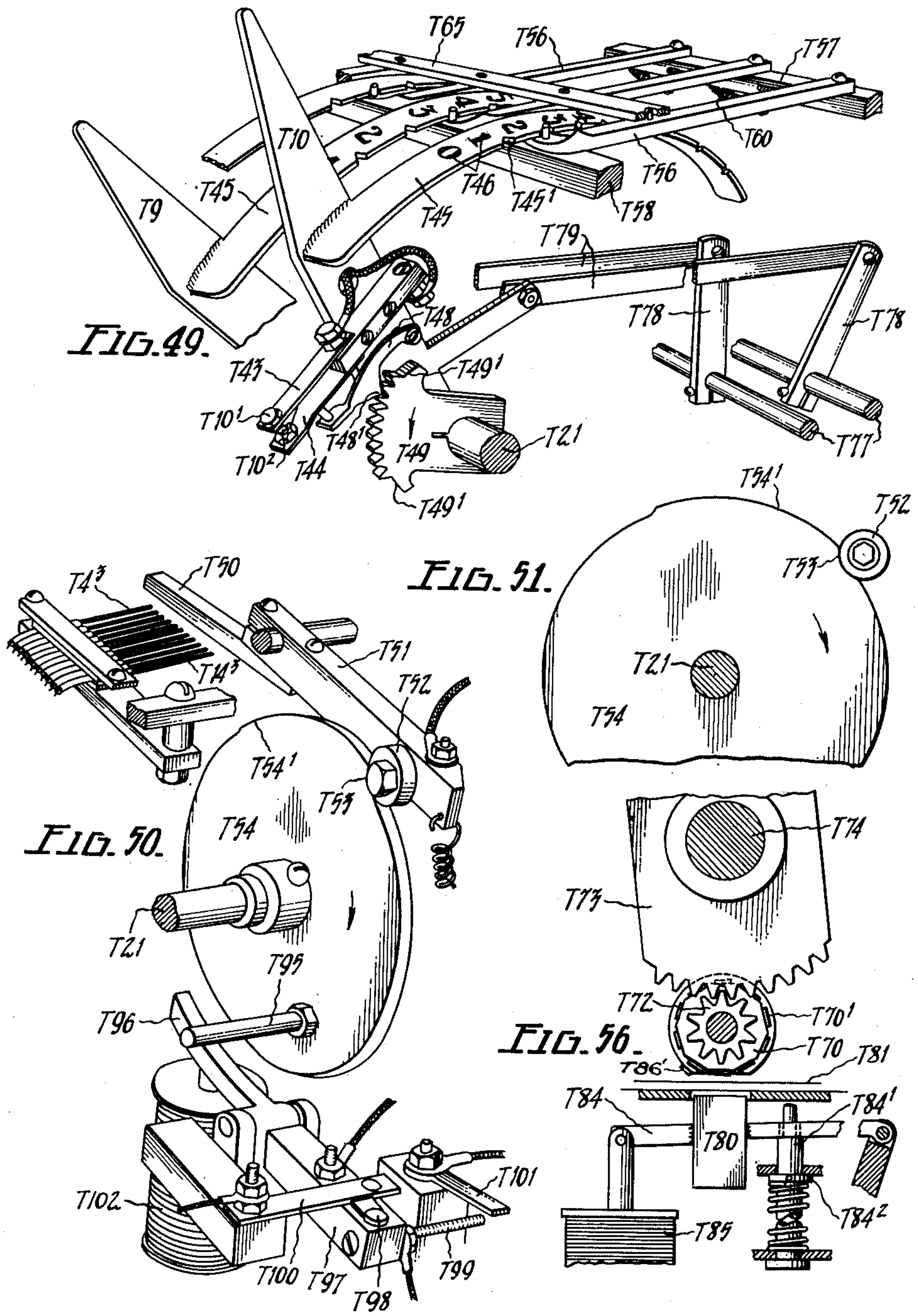
Figure 52:
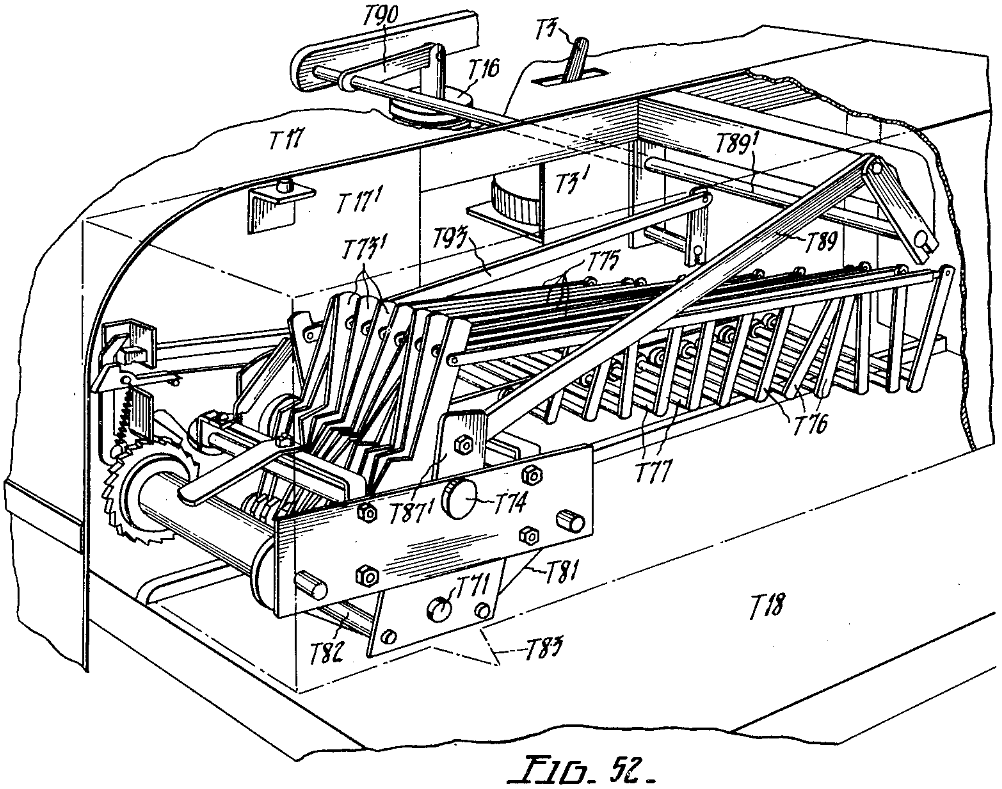
Figure 53:
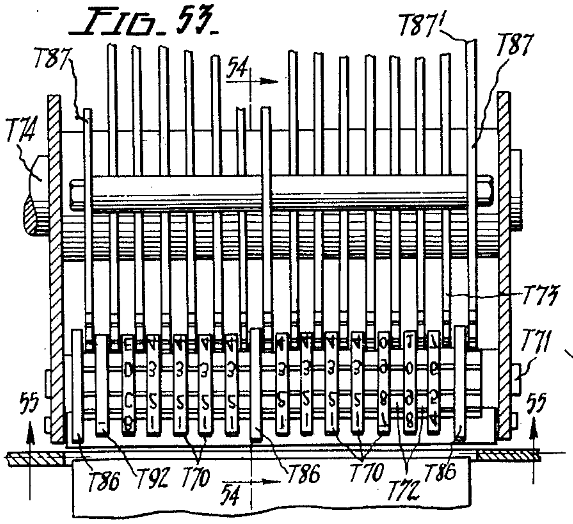
Figure 54:
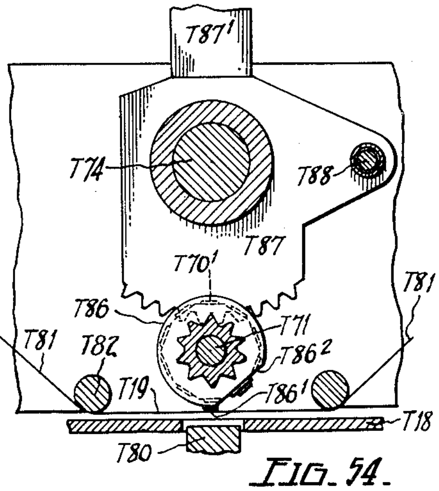
Figure 55:
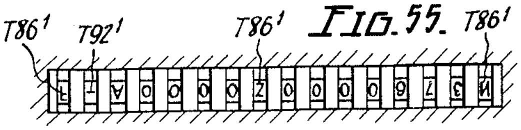
Figure 57:
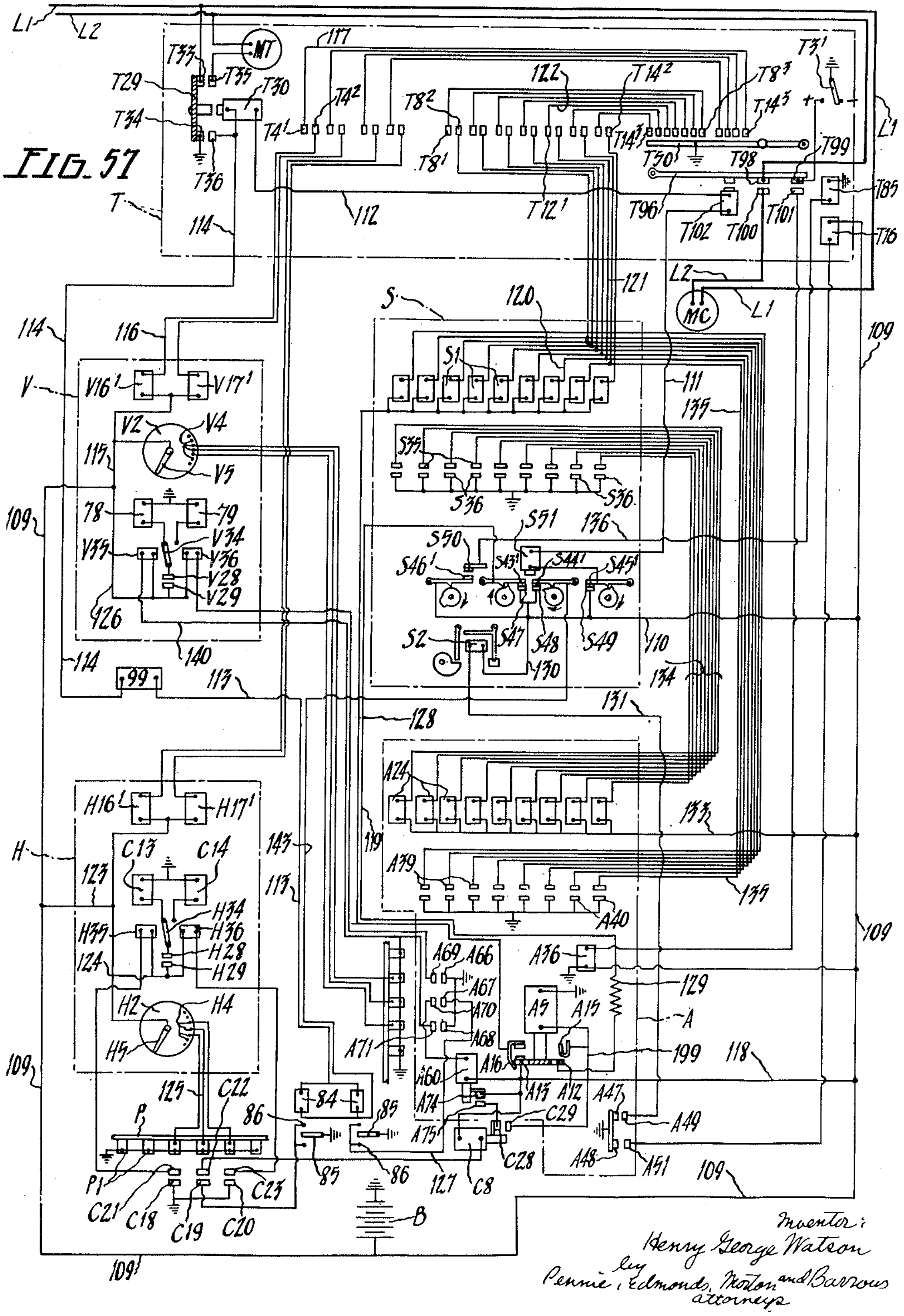
Figure 58:
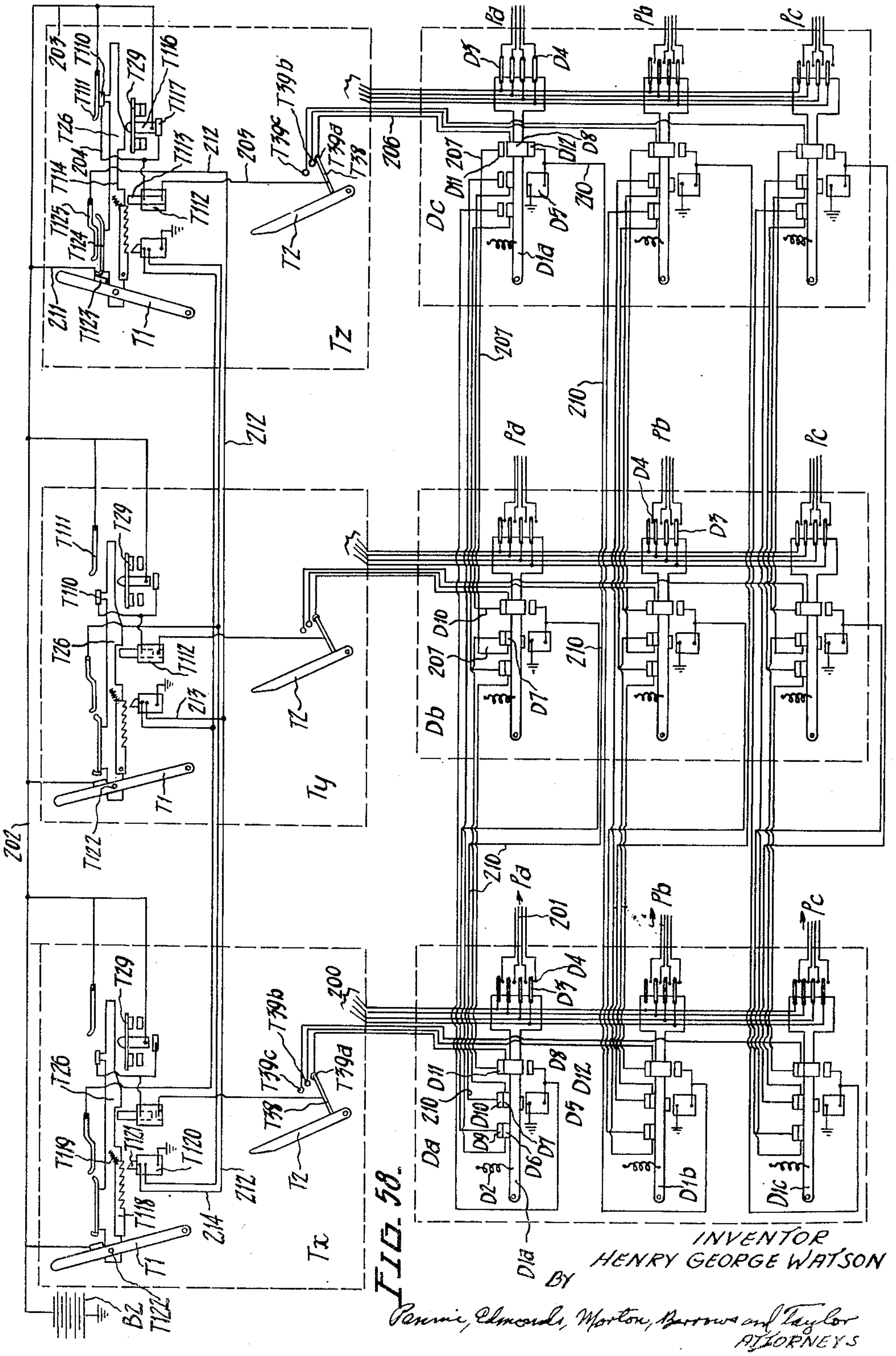

Figures 41, 42, 43 and 44 are views in sectional end elevation of switching mechanism and are taken respectively on the lines 41, 42, 43 and 44 of Figures 37;

Figure 45 is a perspective view of a transmitting apparatus;

Figure 46 is a view in plan of the transmitting apparatus with the major portion of the casing omitted;

Figure 47 is a view in perspective of the starting, and portions of the selecting, mechanism of the transmitting apparatus;

Figure 48 is a diagrammatic plan view of interlocking means included in the transmitting apparatus;

Figures 49 and 50 are perspective views of other portions of the transmitting apparatus;

Figure 51 is a view in end elevation of a cam;

Figure 52 is a view in perspective of printing mechanism included in the transmitting apparatus;

Figure 53 is a view in front elevation of portions of the printing mechanism;

Figure 54 is a view in sectional end elevation and is taken on the line 54—54 of Figure 53;

Figure 55 is a view in inverted sectional plan taken on the line 55—55 of Figure 53;

Figure 56 is a view similar to Figure 54 of other portions of the printing mechanism;

Figure 57 is a wiring diagram of the apparatus illustrated in the preceding figures, and Figure 58 is a wiring diagram of panel discriminating apparatus.

*Brief general description*

Referring initially to Figures 1 to 4 inclusive, the illustrated embodiment of the invention comprises:

T—a transmitter and apparatus controlled by the transmitter, such controlled apparatus having the following principal components—

P—an indicator panel;

N—a plurality of counting devices arranged in vertical columns, and horizontal rows on the panel;

A—an actuating device so supported behind the panel that same may be moved into operative engagement with any one of said counting devices;

C—a carrier frame arranged to be moved horizontally behind the panel and on which the actuating device is movable vertically;

V—a selecting device arranged to control vertical movements of the actuating device whereby the latter may be moved into register with any desired row of counting devices N;

H—a selecting device arranged to control horizontal movements of the carrier frame whereby the actuating device may be moved into register with any desired column of said counting devices;

S—a transfer device adapted to register impulses received from the transmitter and to transmit corresponding impulses to the actuating device when the latter is in operative engagement with a selected counting device N. This transfer device is also employed to transfer values between elements of different denominations, embodied in the numbering devices;

D—a panel discriminating unit which is required only when a plurality of panels P and corresponding groups of counting devices are employed and it is required to control any one such panel by means of one or more transmitters T;

MC—an electric motor for driving various portions of the controlled apparatus.

The transmitter T is provided with a plurality of manually operable levers T', T2 . . . T14 of which T' is a starting lever by operation of which a driving motor MT incorporated in the transmitter is started to cause impulses to be transmitted to different units of the controlled apparatus.

T2 operates a panel discriminating switch by means of which the desired panel P is selected.

T3 operates an addition or subtraction discriminating switch which is operated to determine whether selected values will be added to or subtracted from a selected counting device N.

T4 and T5 are setting levers for controlling the row selector V, while the setting levers T6 and T7 similarly control the column selector H.

Finally the setting levers T8 and T14 are operated to determine the value to be added to or subtracted from a selected counting device N.

In the ensuing brief general description of the operation of the apparatus it is assumed that only one transmitter T and one panel P are provided, in which case the aforesaid panel discriminating lever T2 of the transmitter and the panel discriminating unit D of the controlled apparatus are eliminated.

In operation the setting levers T4 and T5 are adjusted to select that row of the numbering devices N in which a required numbering device is located and the setting levers T6 and T7 are similarly adjusted to select the required column of such devices.

Likewise the levers T8 . . . T14 are adjusted to determine the value to be added to or subtracted from the required numbering device and the discriminating switch T3 is adjusted for addition or subtraction as required.

At this stage the starting lever T1 is operated whereby impulses corresponding in number to the positions of the levers T4 . . . T14 are simultaneously transmitted through independent channels to the appropriate units of the controlled apparatus, which latter may be remote from the transmitter.

Thus impulses determined by the positions of the levers T4 and T5 are transmitted to the row selector V, impulses determined by the setting of the levers T6 and T7 are transmitted to the column selector H and impulses corresponding to the positions of the levers T8 . . . T14 are transmitted to and are registered by the transfer device S as functionally illustrated by Figure 3.

The row selector V is thus actuated to cause a magnet C1 corresponding to the required row, to be energised, while similarly the column selector H operates to effect energisation of a magnet P1 corresponding to the required column.

At this stage the driving motor MC of the controlled apparatus is caused to move the actuating device A vertically until it registers with the required row as determined by the energised magnet C1, and is also caused to move the carrier frame C horizontally until the said actuating device is in register with the required column as determined by the energised magnet P1. Thus the actuating device is moved into register with the selected numbering device N.

The actuating device is then operatively engaged, as hereafter described, with the selected counting device N, after which the transfer device S is operated to transmit to the operating mechanism of the actuator, groups of impulses corresponding to those previously transmitted to it by the transmitter.

Thus the selected device N is actuated to add or subtract the required value thereto or therefrom and at the conclusion of the operation the apparatus returns to its normal condition whereby it is ready for a further operation. Until the next succeeding operation of the apparatus the actuating device remains in register, but not in operative engagement with the counting device N previously operated.

Figures 1, 2:
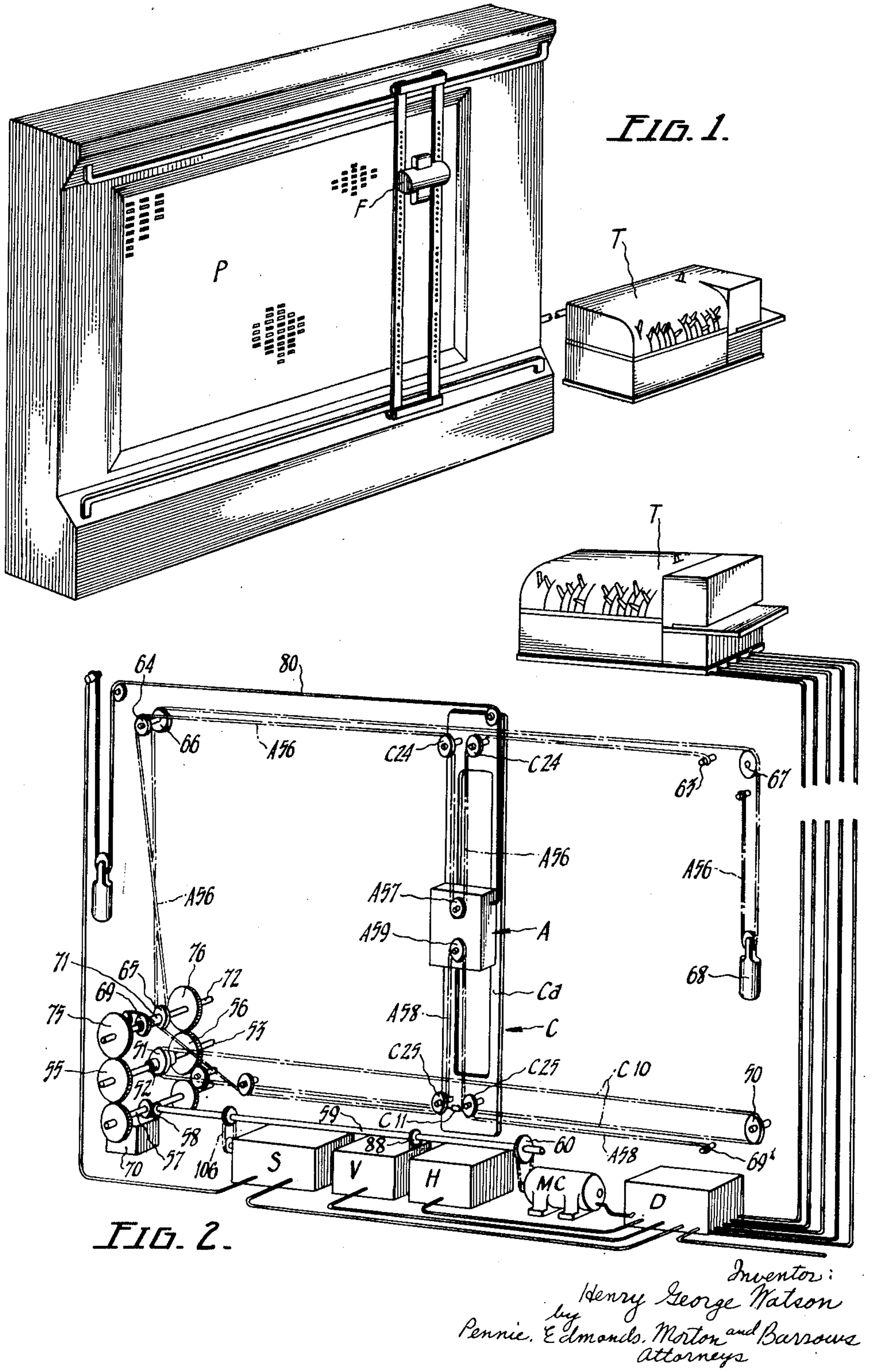
Figure 1 is a perspective view showing the front of an indicator panel.
Figure 2 is a diagrammatic view in oblique projection showing inter alia means for moving the actuating device on the panel.

The transmitter also preferably includes means as hereafter described for printing particulars of each operation on an order form, while as shown in Figure 1 a microfilm camera F may be movably supported in front of the panel whereby a photographic record may be made at suitable time intervals of the number displayed by each individual counting device N.

Accordingly any desired value may be added to or subtracted from any required counting device N on the panel P through the medium of the common actuating device A.

The detailed construction and operation of the apparatus are explained in the ensuing more particular description.

*Indicator panel and counting devices*

The indicator panel is of relatively large size and of rectangular shape and is preferably arranged vertically as shown, and same comprises a perimetrical frame P2, the upper and lower members of which are connected by a plurality of closely spaced vertical bars P3 of rectangular shape in cross section and arranged with their faces at right angles to the plane of the panel. The front of the panel is lined with sheet material P14 in which is formed a plurality of laterally elongated slots P5 arranged in vertical colums and horizontal rows, one of the said bars P3 being arranged between each adjacent pair of said columns.

The vertical bars P3 are connected together at intervals by horizontal tie bars P10 fitted with spacing tubes P11 and a plurality of horizontal retaining rails P6 are secured to but are spaced from, the rear edges of, the said vertical bars.

A horizontal series of electromagnets P1 is arranged at the base of the panel frame P2, one such magnet being arranged in a position corresponding to each column of slots P5 with its core extending upwardly through a corresponding hole in a horizontal flange in the lower member of the frame P2.

A counting device N is arranged behind each slot P5 in the face of the panel whereby the number displayed thereby may be observed through said slot, the said counting devices being thus arranged in vertical columns between the adjacent pairs of vertical bars P3. In the illustrated apparatus it is assumed that 1000 of such counting devices are mounted on the panel in 25 vertical columns, each containing 40 counters.

Each counting device has a rectangular casing N1 which fits neatly between the corresponding vertical bars P3 of the panel frame and is open at the back and front, the said casing being provided at each side thereof with a short laterally projecting flange N2 which overlaps one half of the rear edge of the corresponding bar P3. Thus when a horizontal row of counting devices is mounted on the panel, the adjacent flanges N2 of each adjacent pair thereof abut in the central plane of the intervening bar P3, and such adjacent portions are detachably secured to the said bar by a common screw P4, the head of which is of conical shape to locate the movable actuating device A as hereafter described.

The casing N1 is fitted with two fixed transverse spindles N3 and N4 respectively arranged one behind the other and the front spindle N3 freely supports a plurality of independently rotatable discs N5 for values of different denominations and each provided on its periphery with a sequence of characters which may be viewed through the respective slots P5 in the front of the panel. For the present purpose it will be assumed that the ordinary arithmetical scale is employed, in which case each of these discs N5 is provided at equal angular intervals with the ten numerals "0" to "9" inclusive, as is usual in mechanical counting devices. It will be apparent that any desired number of discs N5 may be included in each counting device and that one or more of such discs at the right hand end of the counting device, as viewed from the front of the panel, may designate decimal fractions.

A pinion N6 is provided with 10 teeth (one for each numeral character) is rigidly connected to each number disc N5, each of such pinions being in constant mesh with a corresponding driving gear N7 provided with 20 teeth and rotatably mounted on the rear spindle N4 of the casing. Each number disc N5 is normally restrained against rotation by an individual resilient detent N8 which engages the teeth of the coacting driving gear N7.

Each of the said driving gears is provided on one face with a cam N9 formed with a diametrically opposed pair of lobes whereby, as hereinafter described, unit values are added to or subtracted from each number disc as the adjacent disc of lower denomination is moving from the "9" to the "0" position or vice versa.

Each individual numbering device N is thus of comparatively simple and inexpensive construction, as same does not include means for actuating the driving gears N7.

Associated with each counting device is a spindle N10 which extends horizontally from the front to the back of the panel through bearings in the corresponding casing N1. Each of these spindles is provided at its forward end with a finger grip and pointer N11, while the rear end thereof is fitted with a short radial arm N12 which, as hereinafter explained, constitutes an adjustable stop for engagement by a switch actuating push rod A45 on the common actuating device, and by an adjacent portion of the hinged frame of said actuating device.

These arms N12 are hereinafter referred to as "frozen" stops, because when any such arm is disposed in its operative position, it prevents the corresponding counting device being operated by the actuating device. Thus, for example, although a quantity of certain goods may be held in the store, as shown by the corresponding counting device N, such goods may be reserved for a particular customer, in which it is desirable both to prevent operation of the said counting device and to indicate both on the panel, and at the transmitter, that the goods are "frozen." It will be evident from the immediately preceding description that the respective pointer N11 on the front of the panel indicates whether or not the corresponding goods are "frozen," while, as hereafter explained, an appropriate indication is printed on an order form at the transmitter when an attempt is made to operate any counting device for which the corresponding pointer is set at the "frozen" position.

*Means for supporting moving and locating the actuating device*

The carrier frame C arranged close to the back of the panel P is of hollow rectangular shape, and same extends vertically from the top to the bottom of the said panel. This carrier frame is movable laterally with respect to the panel for which purpose the former is provided adjacent its upper end with grooved supporting rollers C2 which rest on a rail $P2^a$ incorporated in the upper transverse member of the panel frame P2.

Similarly, a pair of grooved guide rollers C3 mounted on a lower portion of the carrier frame engage a guide rail $P2^b$ incorporated in the lower transverse member of the panel frame.

The inner faces of the vertical side members C' of the carrier frame are provided at the requisite intermediate positions with transversely opposed pairs of retaining hooks C4 which engage the aforesaid intermediate retaining rails P6 which extend horizontally at the back of the panel frame. These hooks C4 prevent deformation of the carrier frame by the reaction thrust of the actuating device A when the latter is operatively engaged with a selected counting device N, as hereinafter described.

In order to maintain the carrier frame in an upright position, as viewed from the back thereof, same rotatively supports a vertical spindle C5 provided at its upper and lower ends with pinions C6 which are in constant mesh with the teeth of guide racks P7 secured respectively to the upper and lower transverse members of the frame P2 of the panel.

The transverse member $P2^b$ embodied in the lower transverse member of the panel frame P2 is formed with a horizontal series of uniformly spaced locating holes P8, equal in number and spacing to the vertical columns of counting devices N on the panel.

A solenoid C8 supported on a lower portion of the carrier frame is provided with an axially movable plunger C9 which projects through a hole in one of the vertical side members $C^a$ of the carrier frame whereby its free inner end is normally disposed adjacent to but clear of the member $P2^b$ of the panel frame and in alignment with the common horizontal centerline extending through the locating holes P8 in the latter.

The solenoid plunger C9 serves as a locating pin, for which purpose its forward end is tapered as shown, and when the carrier frame is disposed in register with any particular vertical column of counting devices N this locating pin is disposed in coaxial alignment with the corresponding locating hole P8.

It will hereafter be explained that when the carrier frame is moved to any such position the solenoid C8 is energised whereby the locating pin C9 is projected to enter the corresponding locating hole P8 so that the carrier frame is locked to the panel P. Means may be provided to cushion the impact of the locating pin C9 when its forward movement is arrested.

One of the vertical side members $C^a$ of the carrier frame is provided with a rearwardly extending flange $C^b$ which extends substantially the full height of the panel P and such flange supports a vertical series of horizontal electromagnets C′ which are equal in number and spacing to the horizontal rows of counting devices N on the panel.

As previously indicated, and hereinafter more fully explained, one of these magnets C1 is energised when the transmitter is operated whereby the vertical movement of the actuating device A will be arrested when said actuating device is in register with the required row of counting devices.

One side member of the carrier frame is also formed with a vertically arranged series of locating holes C26 equal in number and spacing to the rows of counting devices N. These locating holes are alternatively engageable by a locating pin A73 on the actuating device A as hereafter described.

Figures 3, 4:
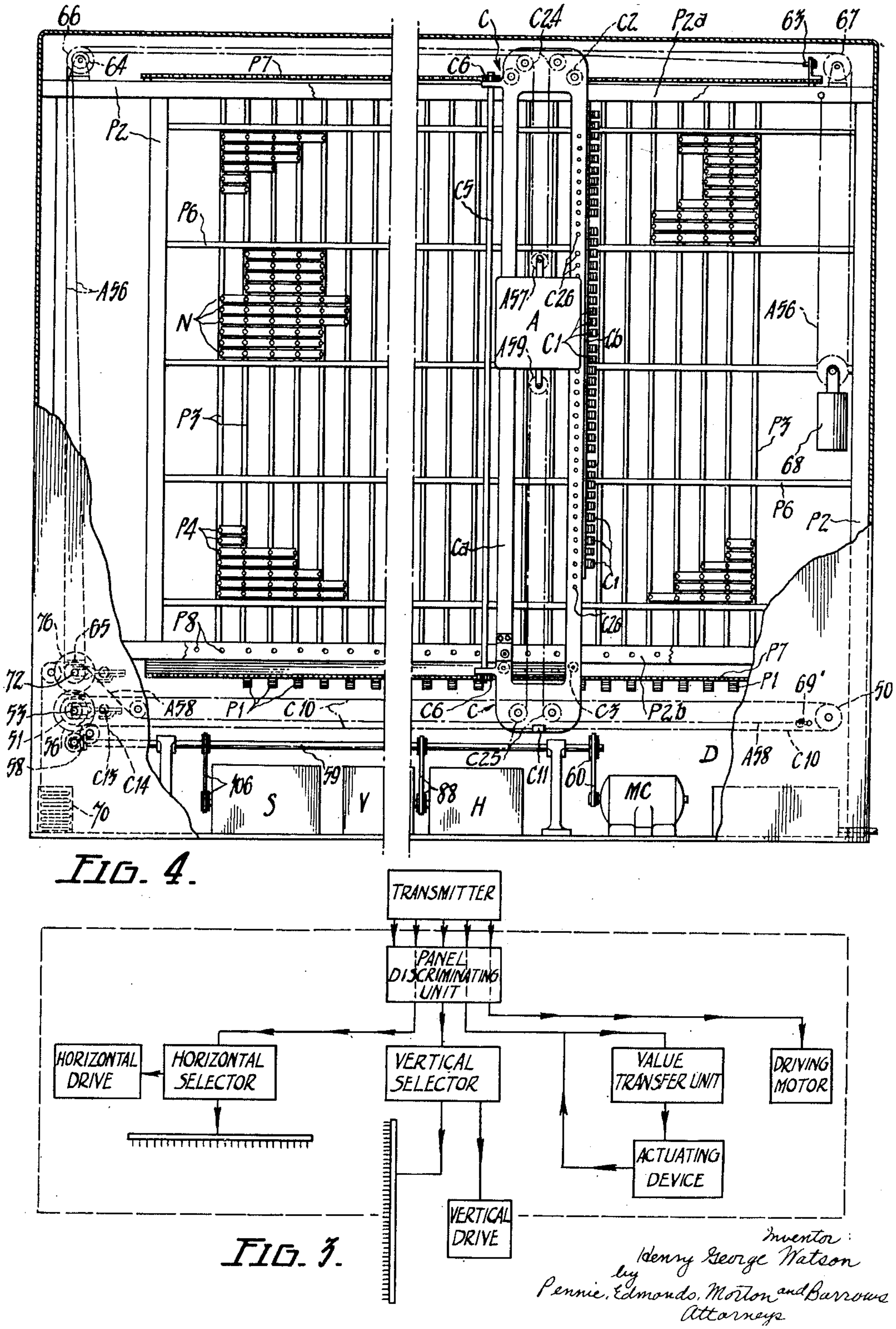
Figure 3 is a block diagram showing the functions of the principal units of the apparatus.
Figure 4 is a view in rear elevation of the panel and appurtenant apparatus.
Figure 9:
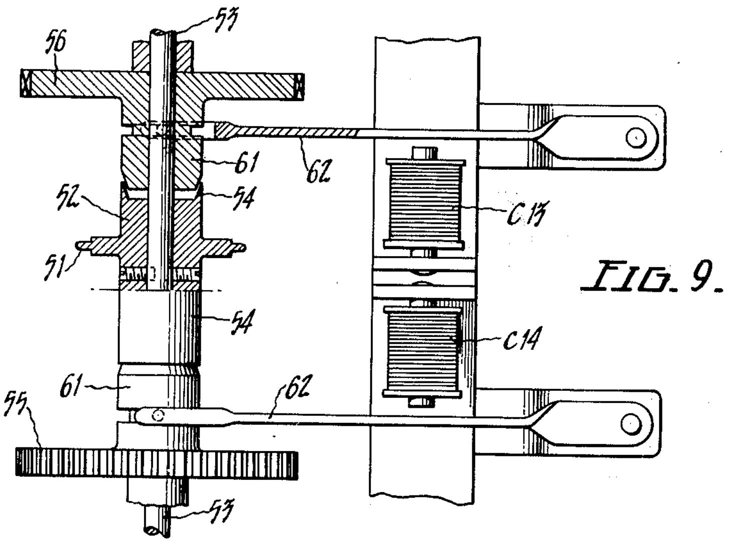
Figure 9 is a view in plan and partly in section of driving means for the carrier.

The carrier frame C is traversed behind the panel P by means of an endless chain C10 arranged horizontally adjacent the bottom of the panel and having its lower reach secured at C11 to the carrier frame. Figs. 2, 4 and 9.

The chain C10 extends around an idler sprocket 50 adjacent one end of the panel frame and around a driving sprocket 51 arranged adjacent the opposite end thereof.

The driving sprocket 51 is secured to a sleeve 52 secured to a transverse spindle 53, such sleeve being provided at its opposite ends with female friction clutch members 54.

The said sleeve 52 is arranged between a pair of gears 55 and 56 which are rotatively mounted on the spindle 53 and which are arranged to be driven in unison but in opposite directions from a countershaft 57 in the manner shown diagrammatically in Figure 2 of the drawings. See also Fig. 9.

This countershaft 57 is in turn connected by bevel gearing 58 to a common drive shaft 59 arranged horizontally below the panel P and connected by reducing gearing 60 to the common driving motor MC of the controlled apparatus.

A male friction clutch member 61 individual to each of said clutch members 54 is arranged for coacting engagement therewith, and is secured to the corresponding driving gear 55 or 56, which latter is capable of a limited sliding movement on the spindle 53.

Each clutch member 61 is operable by a corresponding shifting lever 62 which is pivotally supported at one end and an intermediate portion of which is arranged in coacting relation with a corresponding magnet C13 or C14. Thus when the motor MC is operating and either of the magnets C13 or C14 is energised, the corresponding friction clutch elements are engaged to cause the carrier frame C to be moved horizontally in the corresponding direction.

Figure 12:
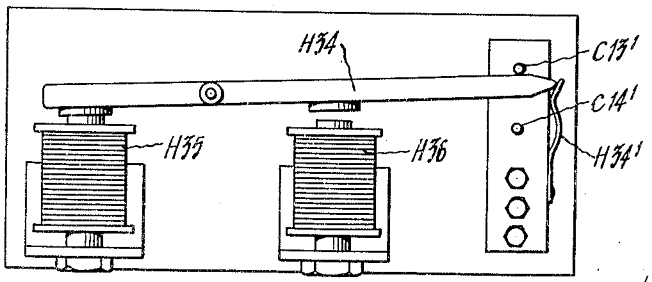
Figure 12 is a view in elevation of direction relays.
Figure 17:
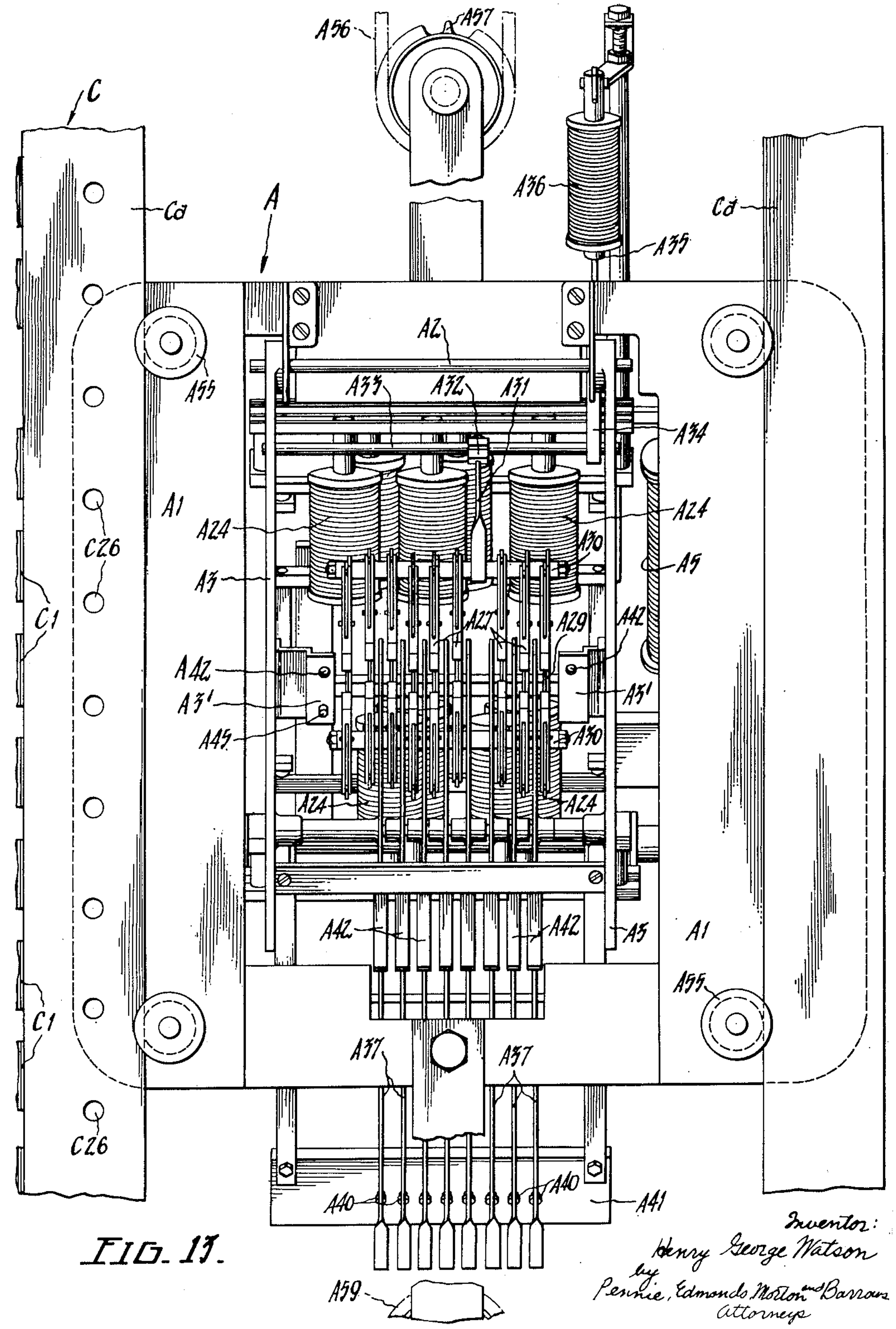
Figure 17 is a view in sectional plan of the elements shown in Figure 16.
Figure 14:
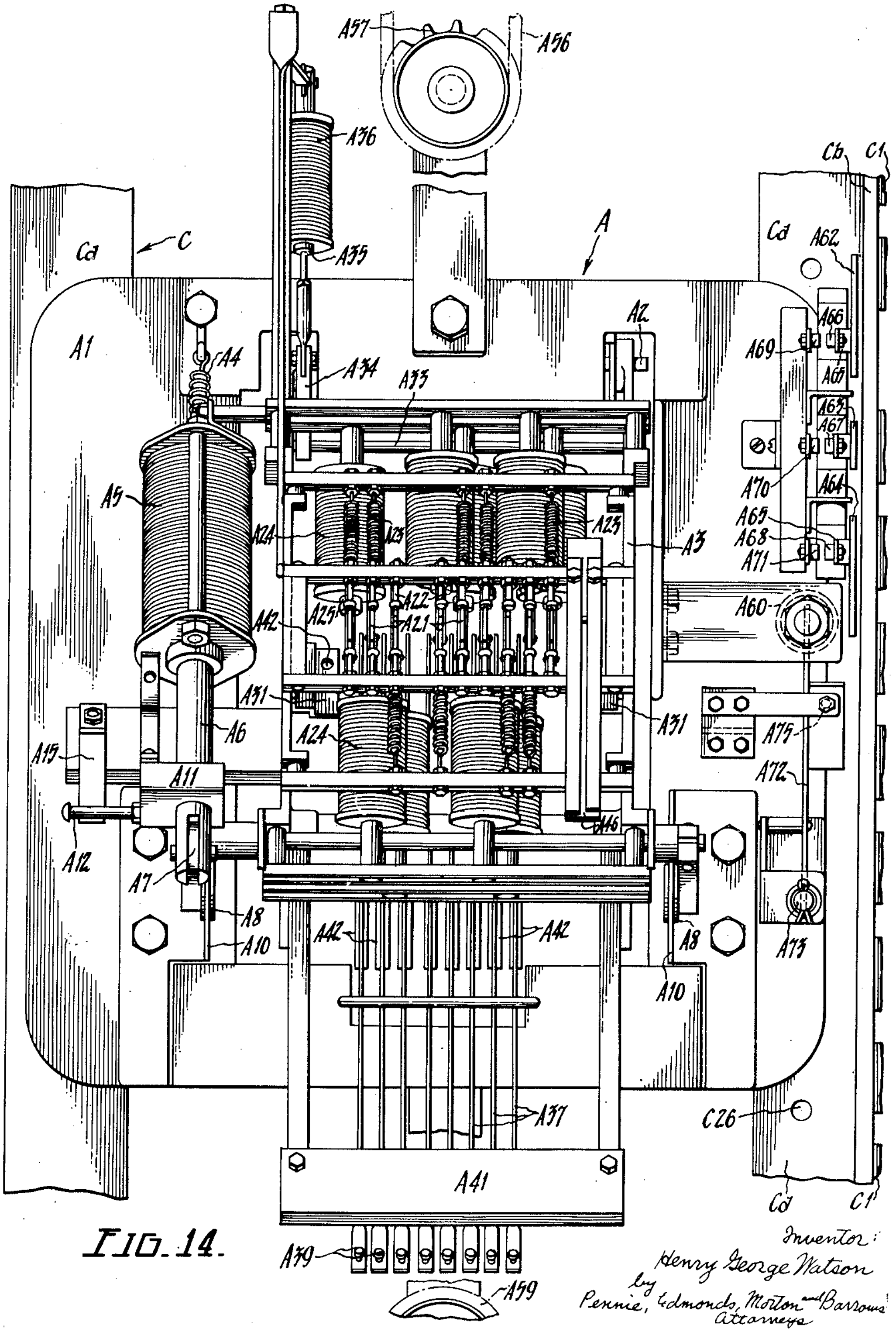
Figure 14 is a view in rear elevation of the common actuator.

The clutch operating magnets C13 and C14 are connected in circuit with fixed contacts C13′ and C14′ respectively of the direction relay shown in Figure 12 whereby same are alternatively engageable by a pivoted contact arm H34 which is normally maintained in one or other of its extreme positions by a spring H34′. The contact arm is provided on opposite sides of its pivotal axis with two spaced armatures which coact with corresponding electromagnets H35 and H36 respectively, the circuits of which are hereafter explained. Thus by energising either the magnet H35 or H36 the circuit of the appropriate clutch operating magnet C13 or C14 is prepared.

The carrier frame is provided adjacent its lower end with three spaced armatures C15, C16 and C17 arranged in a common horizontal plane and each of which is secured to the one end of an arm which is pivoted intermediate its ends to the carrier frame. Each of these arms supports a projecting contact C18, C19 or C20 which is normally separated from a coacting contact C21, C22 or C23 fixed to the carrier frame.

The horizontal distance between each pair of the armatures C15, C16 and C17 is equal to the distance between adjacent vertical columns of the counting devices N on the panel frame, and same are normally disposed above but adjacent to the upper ends of the cores of the magnets P1 which, as previously explained, are arranged at the same spacing.

Accordingly, when the carrier frame C is disposed in register with any vertical column of the counting devices N, the central armature C16 on said carrier frame is in register with the magnet P1 corresponding to that column while the armatures C15 and C17 are simultaneously in register with the magnets P1 corresponding to the columns on each side thereof.

It has already been mentioned that when the transmitter T is operated it causes the column selector H to be operated to effect energisation of the magnet P1 which corresponds to that column in which the counting device N to be operated is located. Also at a subsequent stage the appropriate clutch member 61 is caused to engage the coacting clutch member 54 whereby the carrier frame C is moved laterally towards the required column.

Now when the carrier frame moves into register with the required column, the central armature C16 thereon registers with and is attracted by the energised magnet P1 so that the contacts C19 and C22 are closed. The closing of these contacts completes the circuit of the locating solenoid C8 so that the plunger C9 thereof is projected to enter the required locating hole P8 on the panel frame. Accordingly the carrier frame is locked in the requisite position and thereafter the operated friction clutch member 61 slips over the coacting clutch member 54 while the motor MC continues to run. The purpose of the armatures C15 and C17 is hereinafter explained.

When the plunger C9 of the "horizontal" locating solenoid C8 moves towards its operated position it closes a coacting pair of normally open contacts C28 and C29 and the purpose of which is hereafter explained.

The common actuating device A is slidable vertically on the carrier frame C, for which purpose the main frame A1 of said actuating device is fitted with a plurality of flanged guide rollers A55 which engage the inner edges of the vertical side members $C^a$ of the carrier frame.

The said actuating device is supported and is movable vertically by a depending loop in a chain A56 which passes around a sprocket A57 on the frame A1 and then upwardly around a pair of idler sprockets C24 on the upper portion of the carrier frame C. The chain extends from one of said sprockets C24 to a fixed anchorage 63 on the panel frame and from the other sprocket C24 to and around a guide sprocket 64, then downwardly from the latter to and around a driving sprocket 65, upwardly from the latter to a further guide sprocket 66 thence horizontally to and around a guide sprocket 67 to a suspended balance weight 68.

A further chain A58 attached at one end to an anchorage 69′ on the lower portion of the panel frame extends horizontally therefrom to and around one of a coacting pair of guide sprockets C25 on the carrier frame then upwardly to and around a sprocket A59 on a lower portion of the main frame A1 of the actuating device, downwardly from the last mentioned sprocket to and around the second guide sprocket C25 and from it around any necessary intervening guide sprockets to a driving sprocket 69 arranged coaxially with and rigidly connected to the driving sprocket 65. The other free end portion of the chain A58 depends from this last mentioned driving sprocket into a suitable receptacle 70.

The rigidly connected driving sprockets 65 and 69 are secured to a sleeve 71 fixed to a spindle 72 rotatively supported above and parallel to the spindle 53 and gear wheels 75 and 76 rotatively mounted on the spindle 72 are in constant mesh with the gear wheels 55 and 56 respectively so that when the motor MC is running the said gears 75 and 76 are driven in opposite directions.

A friction clutch is interposed between each of the gear wheels 75 and 76 and the adjacent end of the sleeve 71, such friction clutches and the operating means therefor being identical with those shown in Figure 9 and hereinbefore described. For the purpose of subsequent description, however, the magnets arranged as shown in Fig. 9 to operate the said clutches for the sleeve 71 are identified by the reference characters 78 and 79. Thus when the magnet 78 is energised and the corresponding clutch is engaged, the actuating device A is moved downwardly while when the magnet 79 is energised the actuating device is moved upwardly.

As subsequently explained, the actuating device when moving vertically is locked to the carrier frame when the former moves into register with the required row of counting devices N and when this occurs that friction clutch through which the vertical movement is transmitted commences to slip and such slipping continues while the motor MC continues to run.

Likewise when the carrier frame C is moved horizontally into register with the required vertical column of counting devices N, and is locked to the panel P, as hereinbefore described, the operated friction clutch therefor commences to slip.

A solenoid A60 supported on the main frame A1 of the actuating device is provided with an axially movable plunger which is connected by an intermediately pivoted lever A72 to a spring loaded reciprocable locating pin A73. This locating pin registers with one of the locating holes C26 in the carrier frame when the actuating device is in register with the corresponding horizontal row of counting devices.

The frame A1 of the actuating device is also provided at one side with three armatures A62, A63 and A64 arranged one above the other and the distance between which is the same as that between the rows of counting devices N. Each of these armatures is attached to the one end of an arm A65 which is pivoted intermediate its ends to the frame A1, and said armatures are disposed close to the common vertical plane of the inner ends of the cores of the electromagnets C1 on the carrier frame. When the actuating device is disposed in register with any particular row of counting devices, the central armature A63 is disposed in operative relationship with the magnet C1 for that row, while the armatures A62 and A64 are at that time in register with the magnets for the adjacent upper and lower rows respectively.

As hereinafter explained, the magnet C1 for the required row is energised when the transmitter is actuated and thus as the actuator A moves vertically in the requisite direction, the armature A63 moves into register with and is attracted by the energised magnet C1 when the actuating device is in register with the required row. When the armature A63 is so attracted, a contact A67 on the corresponding arm A65 is moved into engagement with a coacting contact A70 on the main frame A1 of the actuating device, thus completing the circuit of the "vertical" locating solenoid A60. The locating pin A73 is thus projected to enter the corresponding locating hole C26 on the carrier frame C whereby the actuating device is locked thereto in the requisite position.

The arm A65 supporting the upper armature A62 is likewise provided with a contact A66 which engages a coacting fixed contact A69 when said armature is attracted, while the armature A64 is similarly associated with a contact A68 which is normally separated from a coacting fixed contact A71. The functions of these last-mentioned pairs of contacts are hereafter described.

Figures 21, 22:
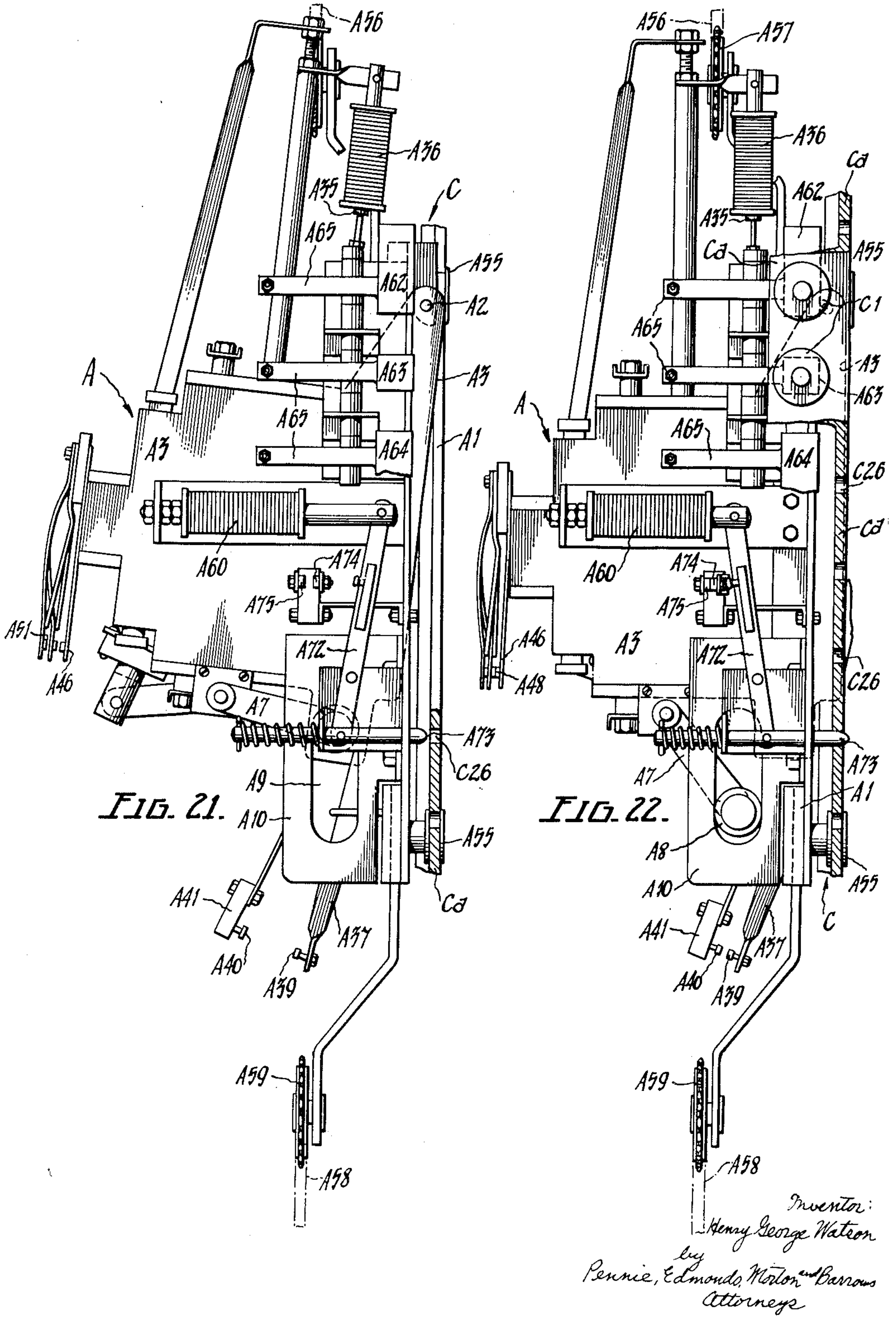
Figures 21 and 22 are views similar to Figures 19 and 20 respectively and showing the opposite side of the actuator.

Now as the locating pin A73 is moved forwardly to its operative position, as above explained, a projection on the actuating lever A72 closes two normally open contacts A74 and A75, as shown in Figure 22. These contacts are arranged in series with the aforesaid contacts C28 and C29 which are closed when the locating pin C9 is projected to lock the carrier frame C to the panel and are also in series with the winding of an actuating solenoid A5 for a hinged frame A3 incorporated in the actuating device.

Accordingly when both of the said locating pins have been engaged in the appropriate locating holes, the circuit of the solenoid A5 is completed whereby the hinged frame A3 is moved forwards to its operative position as hereafter more fully explained.

Figure 10:
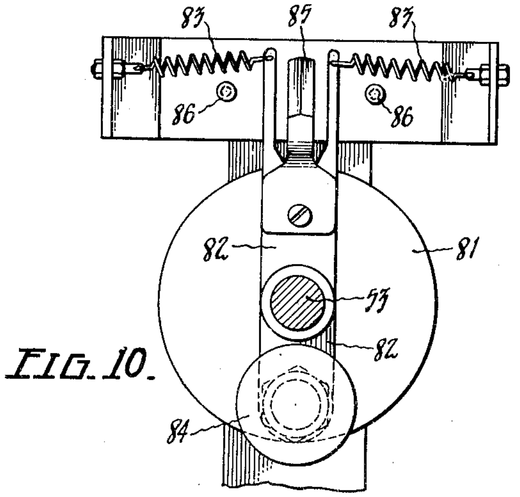
Figure 10 is a view in end elevation of friction operated switching means.
Figure 11:
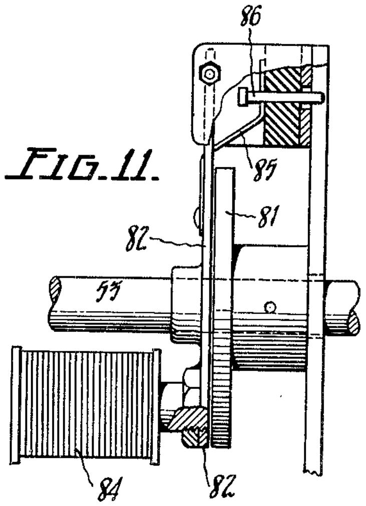
Figure 11 is a view in side elevation and partly in section of the switching means shown in Figure 10.

Each of the aforesaid spindles 53 and 72 for driving the carrier C and actuating device A respectively is provided at one end with a friction disc 81 (Figures 10 and 11) and an arm 82 is pivoted on the respective spindle adjacent to said disc, such arm being normally retained in the vertical position by tension springs 83.

The lower end of the arm supports an electromagnet 84, the core of which is normally disposed adjacent to but clear of the respective face of the coacting friction disc 81 whereby the latter may rotate without imparting an angular movement to said arm. When, however, the magnet 84 is energised, the magnetic field thereof moves the core of said magnet into frictional contact with the coacting friction disc so that said arm is moved angularly in unison with the disc until a contact arm 85 thereon engages one of a spaced pair of contacts 86 which also serve as stops to prevent further movement of the arm 82. As subsequently explained, the contact members 86 associated with the spindle 72 are arranged in parallel with each other and in series with the aforesaid "vertical" locating solenoid A60 for the actuating device so that this solenoid cannot be energised until the respective arm 82 has been displaced in one direction or the other by the respective friction disc.

Similarly the contact members 86 associated with the spindle 53 are arranged in circuit with the "horizontal" locating solenoid C8 so that the latter cannot be energised until the corresponding arm 82 has been displaced.

*Counter operating mechanism of actuating device*

The main frame A1 of the actuating device, and which as previously described is slidable vertically on the laterally movable carrier frame C, is provided adjacent its upper end with a transverse spindle A2 which pivotally supports a hinged frame A3 whereby the lower end portion of the latter may be swung towards and from the back of the panel P.

The actuating device is electrically connected to other units of the apparatus, as hereinafter explained, and such connections may be effected by means of a flexible cable 80 arranged as shown in Figure 2.

Figures 19, 20:
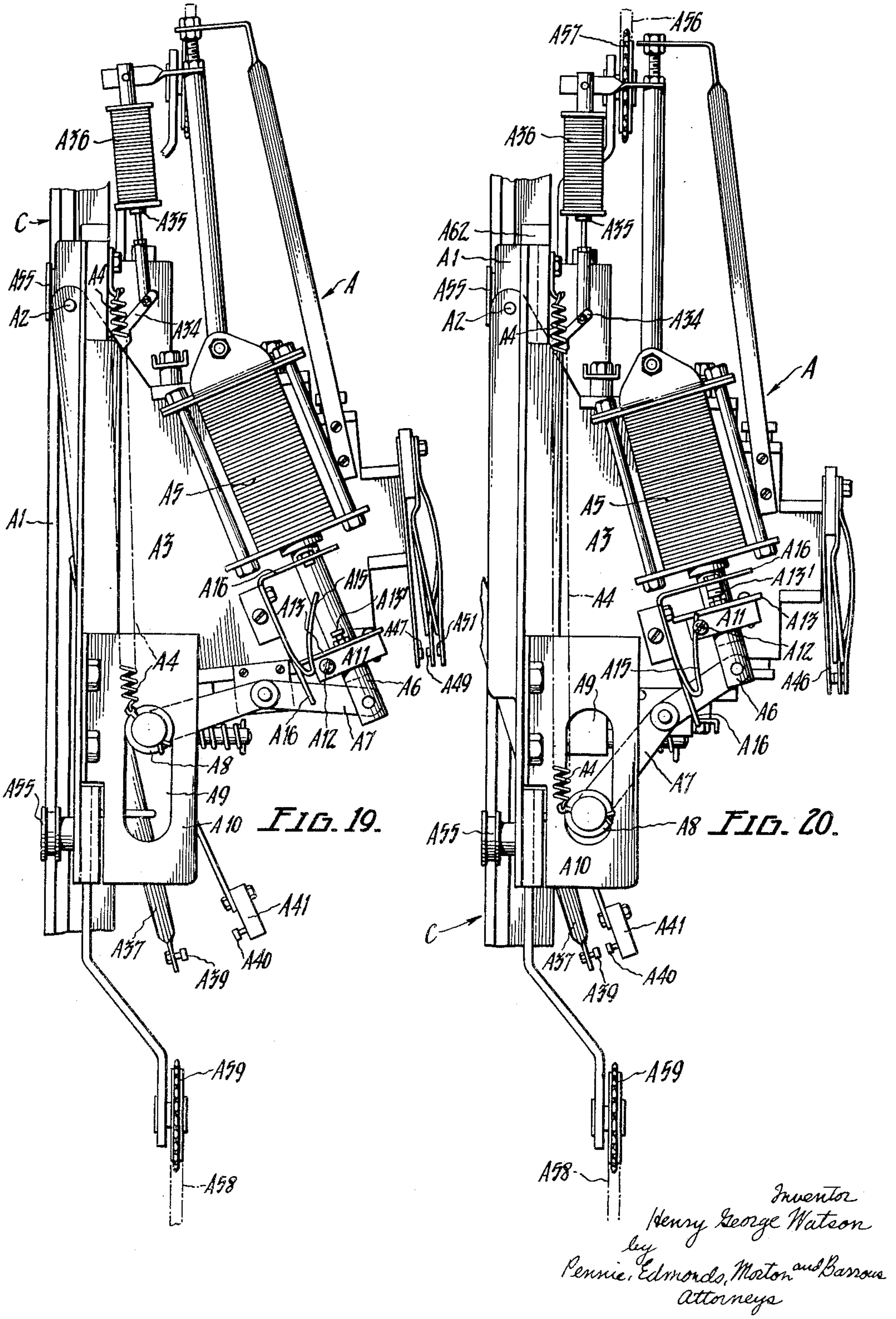
Figure 19 is a view in elevation of one side of the actuator and shows the hinged frame thereof in its inoperative position.
Figure 20 is a view similar to Figure 19 with the hinged frame shown in the operative position.

The hinged frame A3 is normally maintained in the outward position shown in Figures 19 and 21 by means of a tension spring A4, but may be moved forwardly into its operative position by energising a solenoid A5 secured to the hinged frame A3. This solenoid is provided with an axially movable plunger A6, the lower end of which is pivotally connected to the rear end of an arm A7 which is pivoted intermediate its ends to the hinged frame A3 while the opposite end of this arm is fitted with a roller A8 which operates in a vertical guide slot A9 in a flange A10 secured to the main frame A1, the lower end of the aforesaid tension spring A4 being secured to the forward end of this lever A7.

Accordingly, when the solenoid A5 is energised as hereinafter described, the plunger A6 thereof is raised as shown in Figures 20 and 22 whereby the roller A8 is moved downwardly in the guide slot A9 in opposition to the spring A4 thereby causing the hinged frame A3 to swing forwardly on the frame A1 to its operative position in which certain actuating elements thereon operatively engage the driving gears N7 of the particular counting device N in register therewith.

A block A11 of insulating material is secured to the projecting lower end portion of the solenoid plunger A6 and same supports two contacts A12 and A13 respectively and the former of which projects laterally to coact with a curved resilient contact strip A15 secured to the hinged frame A3, such coacting contact elements being disengaged when the hinged frame is disposed in its retracted inoperative position, as shown in Figure 19 while same are engaged, as shown in Figure 20 when the hinged casing is disposed in its forward operative position. As hereafter explained, these contact elements when closed complete a holding circuit for the solenoid A5.

The contact strip A13 on the solenoid plunger engages the lower end of a second resilient contact strip A16 on the hinged frame A3 when the solenoid is deenergised and said hinged frame is disposed in its rearward inoperative position, but this contact is broken as the solenoid plunger moves upwardly to its operated position. However, an adjustable contact screw A13' on the strip A13 engages a rearwardly turned upper portion of the contact strip A16 as the solenoid plunger approaches the upper limit of its movement.

Thus the contact members A13 and A16 are electrically connected when the solenoid plunger A6 is disposed in either of its extreme positions, but are disengaged while said plunger is moving between said extreme positions.

As hereinafter explained, these contact members A13 and A16 are arranged in circuit with electromagnets S1 included in the transfer device S.

Figure 6:
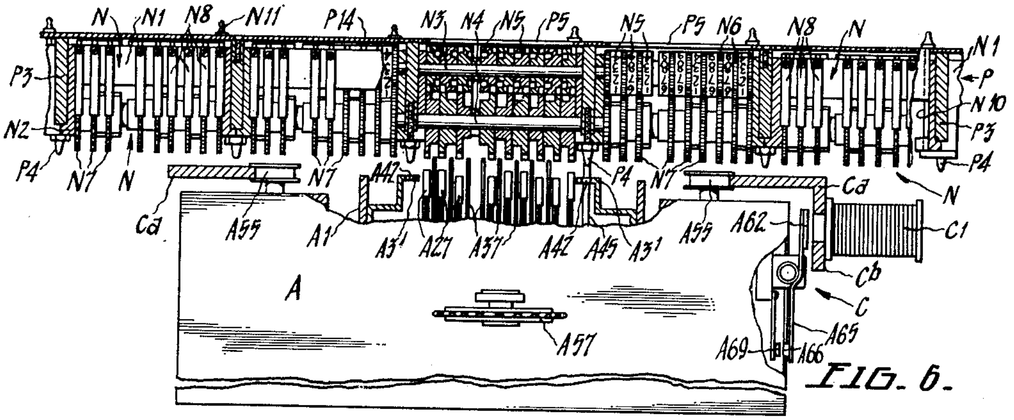
Figure 6 is a view in sectional plan of a portion of the panel and includes a section on the line 6—6 of Figure 5 of a counting device.
Figures 5, 7, 8, 41, 42, 43, 44:
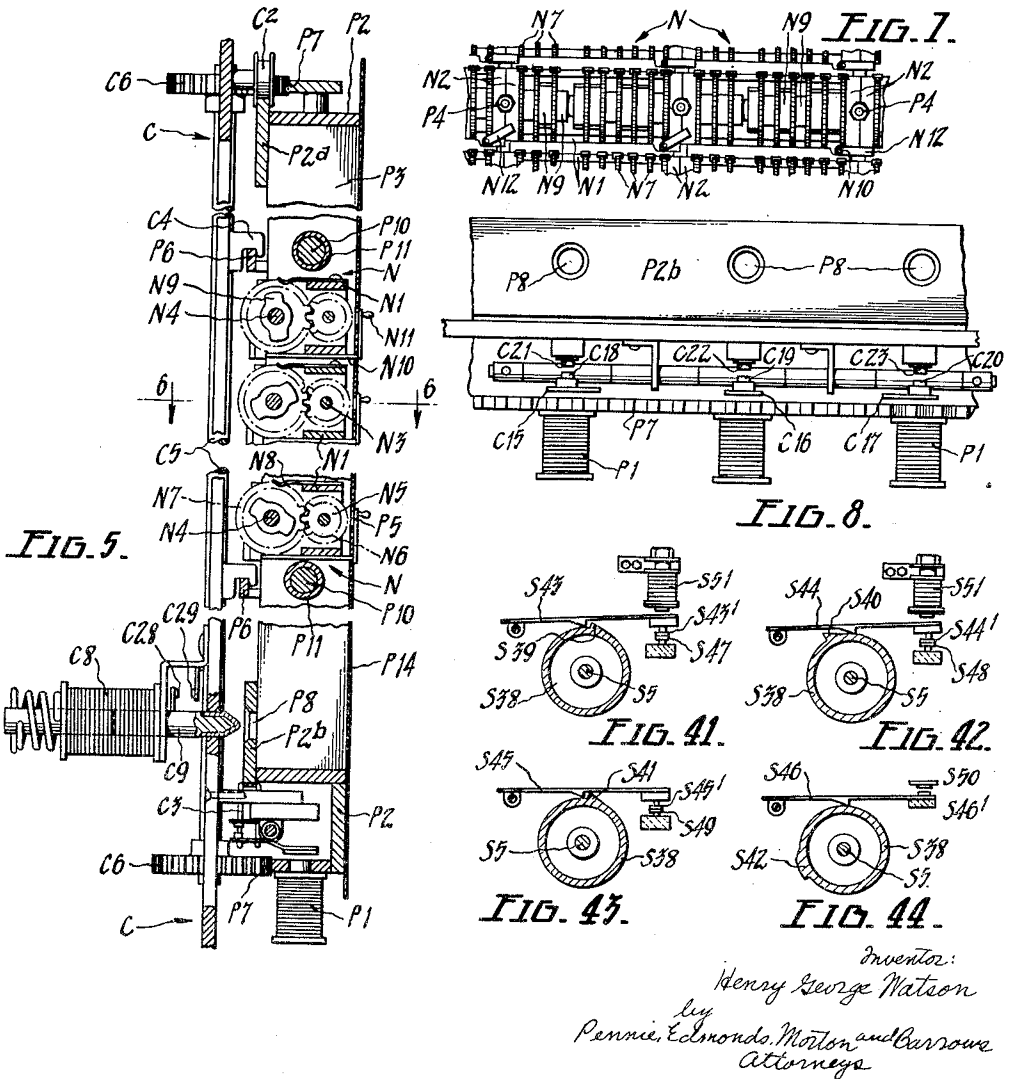
Figure 5 is a view in vertical section of the panel and appurtenant apparatus and is drawn to a larger scale.
Figure 7 is a view in rear elevation showing several of the counting devices supported on the panel.
Figure 8 is a view in rear elevation showing a portion of the lower part of the carrier frame and switch means thereon.

The hinged frame A3 incorporates a laterally spaced pair of flanges A3', each provided with a locating hole A42 arranged to receive the conical locating head on the respective attachment screw P4 of that counting device N with which the actuator is in register, see Fig. 6. Accordingly when the hinged frame A3 of the actuator is moved forwards to its operative position, it is accurately located with respect to the selected counting device.

A transverse spindle A20 secured to the hinged frame A3 pivotally supports a plurality of similar actuating arms A21 arranged side by side, and one of which is provided for each driving gear N7 of the counting devices. The free forward end of each actuating arm is formed with an arcuate head and each arm is provided with a rearward extension A21' which extends between spaced adjustable stops A22 on the hinged frame whereby angular movements of said arms are limited thereby.

Each arm A21 is normally retained in one or other of its extreme positions by a corresponding tension spring A23 and is movable to its other extreme position in opposition to the spring by energising a corresponding solenoid A24 having a slidable plunger A25 connected by a link A26 to the respective arm A21 or extension thereof.

Two alternatively operable spring actuated driving pawls A27 are pivotally mounted in opposed relationship on the head of each actuating arm A21, and said head is shaped to form corresponding projections A28 which serve to prevent overriding movements of the driving gears N7. See Fig. 16.

A pawl selecting lever A29 is arranged at one side of each of the actuating arms A21 and is pivotally mounted on the common pivot spindle A20 for the latter. Each selecting lever A29 is provided at its free end with an enlarged head, the outer end of which is concentric with the pivotal axis except adjacent the ends where inclined shoulders A29′ are provided.

Figures 15, 16, 17, 18:
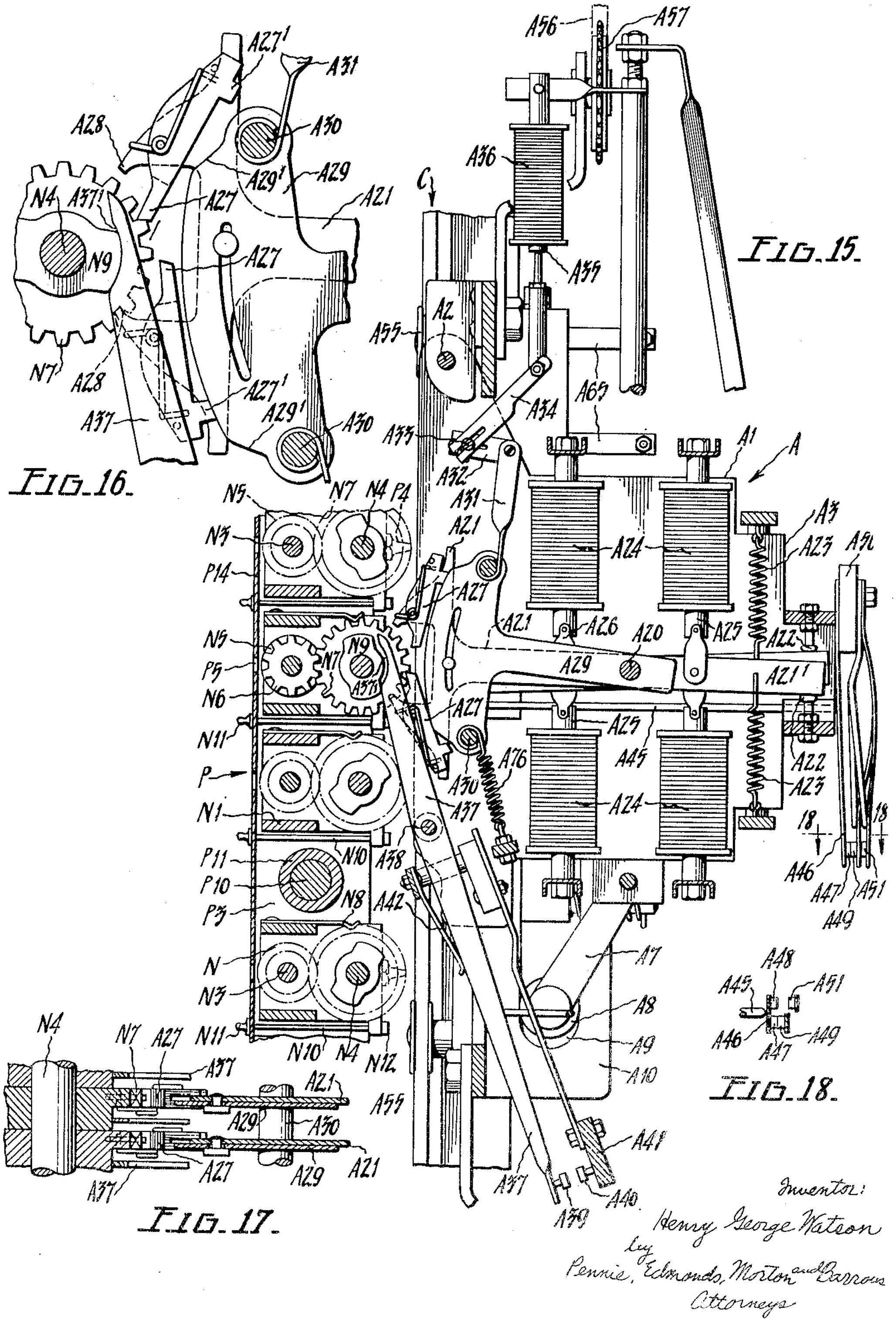
Figure 15 is a view in sectional side elevation of the actuator.
Figure 16 is a view to a larger scale of the means shown in Figure 15 for engaging the counting devices.
Figure 18 is a view in sectional plan taken on the line 18—18 of Figure 15.

The tail of each pawl A27 is formed with a projection A27′, and when the selecting levers A29 are disposed in their elevated positions as shown in Figure 15 said projections on the lower pawls are disposed below the respective shoulders A29′, the free inner ends of said pawls being thus maintained by their associated springs in the forward operative positions. Under these conditions the similar projections on the upper pawls A27 bear against the concentric free edge of the respective selecting levers A29 whereby the free inner ends thereof are retained in their retracted inoperative positions in opposition to their associated springs.

When, on the other hand, the selecting levers A29 are disposed in their lowermost positions, the lower pawls A27 are disposed in their inoperative retracted positions, while the upper pawls are disposed in their projected operative positions.

These pawl selecting levers A29 are operated in unison, for which reason the opposite ends of the heads thereof are connected together by transversely disposed rods A30 the upper one of which is pivotally connected by a link A31 to an arm A32 on a spindle A33 supported for angular movements on the hinged frame A3. This spindle is fitted with a second arm A34 which is pivoted to an extension on the lower end of a plunger A35 of an "addition" solenoid A36 having its upper end pivoted to the hinged frame A3.

Accordingly, when the "addition" solenoid A36 is energised and the plunger thereof is raised as shown in Figure 15 the group of pawl selecting levers A29 are disposed in their raised or "addition" positions, while when the solenoid is deenergised, the weight of the parts assisted by the spring A76 cause the selecting levers to descend in unison to their "subtraction" positions shown in Figure 16, such arrangement being desirable in the case of apparatus used for recording the movement of goods into and out of a store when as is usual the number of "subtraction" transactions corresponding to the removal of goods from the store exceeds the number of "addition" transactions corresponding to the delivery of goods thereto.

Now when the hinged casing A3 is disposed in its retracted position the said driving pawls A27 are disposed clear of the corresponding driving gears N7 of that counting device with which the actuator is in register, as shown in Figure 6, while when said casing is disposed in its forward operative position as shown in Figure 15 the pawls of either the upper "subtraction" group or the lower "addition" group are disposed in operative relationship with the respective driving gears, depending upon the position of the pawl selecting levers A29.

If while the apparatus is in this condition a plurality of current pulses are passed through the circuit of one or more of the solenoids A24, each corresponding actuating arm undergoes a corresponding number of complete froward and return angular movements—that is to say each time the solenoid is energized, the respective actuating arm is moved to its other extreme position in opposition to the associated spring A23, while when the solenoid is deenergised it returns to its original position.

During either the forward or return movement of each actuating lever the operative pawl thereon advances the coacting driving gear N7 through the space of one tooth so that a corresponding movement, i. e. one tenth of a turn, is imparted to the associated pinion N6 and to the number disc N5 rigidly connected thereto. Overriding movements of the driving gears are prevented by the projections A28, each of which enters the space between an adjacent pair of teeth on the respective gear A7 as the latter is moving in the requisite direction.

Accordingly, if say nine successive current impulses are transmitted to any one of the solenoids A24, the corresponding number disc N5 of the selected counting device is moved through nine-tenths of a turn whereby if it be the "units" disc, the value "9" is added to or subtracted from the number displayed at the front of the panel by this counting device. Similarly, a corresponding movement imparted to say the "hundreds" disc would correspond to the addition or subtraction of the value "900."

It may here be remarked that in order to secure a compact arrangement, some of the solenoids are arranged above and some below the actuating arms A21 and some of those in each of these groups are disposed in advance of the pivot spindle A20, and some rearwardly thereof. Accordingly, some of the driving gears N7 are actuated during the forward movements of the respective actuating arms, while the remainder are actuated while the said actuating arms are being moved rearwardly by their respective springs A23.

Now when the "zero" numeral or any number disc N5 of a counting device is moved to the display position, it is necessary to move the adjacent disc N5 of higher denomination through one step in the same direction. Thus if for example the number displayed by a particular counter is say "5347" and it is desired to add "8" units to display the number "5355," the "units" disc N5 is moved through eight steps to display the unit "5," and as same reaches the intervening "zero" position, it is necessary to move the "tens" disc N5 through one step to display the numeral "5." In rotary counting devices it is usual to transfer such movements mechanically direct from each disc to the disc of next higher denomination, but the means necessary for this purpose add materially to the cost of such devices and would amount to a considerable sum, when as in the present apparatus a large number of individual counters is used.

As previously explained, each number disc N5, other than that of the highest denomination, is provided at one side thereof with a cam N9 provided with a diametrically opposed pair of lobes. Now when the hinged frame A3 of the common actuating device is disposed in its forward operative position, these cams are engaged by the free upper ends of a corresponding group of switch arms A37 which are pivoted intermediate their ends on a common transverse spindle A38 supported on said hinged frame.

The lower end of each of the switch arms A37 is provided with a contact A39 which is normally disposed out of engagement with a coacting contact A40 mounted on a common support A41 of insulating material secured to the hinged frame A3.

The upper end of each switch arm A37 is provided in its forward edge with an arcuate recess A37' and said upper end is urged forwardly by a spring A42 whereby it is maintained in contact with the respective cam N9 when the hinged casing A3 is disposed in its forward operative position. When the common centre line of the lobes of the respective cam N9 is disposed vertically one of the diametrically opposed low portions of the cam is received within the recess A37' in the upper end of the switch arm A37 and the latter is disposed in its most forward position whereby the contacts A39 and A40 are closed.

When, however, the driving gear N7 moves in either direction from the said position in which the contacts A39 and A40 are closed the upper end of the switch arm is moved rearwardly by the advancing cam lobe to open the said contacts. See Fig. 15. Accordingly said contacts are closed twice during each complete revolution of the coacting gear N7, or once during each revolution of the corresponding number disc N5, that is when the latter is disposed between its "zero" and "nine" positions.

As hereinafter explained, each contact A39 is arranged in circuit with that electromagnet S1 embodied in the transfer device S which corresponds to the number disc N5 of next higher denomination whereby a current impulse is recorded and subsequently transmitted to the solenoid A24 corresponding to the last-mentioned number disc.

A push rod A45 slidably mounted in the hinged frame A3 is disposed substantially horizontally and at right angles to the plane of the panel, and same is normally urged forwardly by a depending strip spring A46 on said hinged frame whereby the forward end of the rod normally projects through the flange A3' of said frame, as shown in Figure 6.

The strip spring A46 is provided adjacent its lower end with two contacts A47 and A48 respectively, of which A47 is arranged to engage a contact projection on the lower end of a contact spring A49 secured at its upper end to an insulation block A50, while the contact A48 is similarly arranged to engage a contact projection on a contact spring A51 attached to the block A50.

Both of the said coacting pairs of contacts A47 and A49 and A48 and A51 are normally open, but the gap between the latter pair is greater than that between the former pair thereof so that when the push rod is moved rearwardly to its full extent in opposition to the spring A46, the said pairs of contacts close in succession.

Now in normal operation of the apparatus the forward end of the push rod A45 abuts against the flange N2 of the casing of the selected counting device, as the hinged frame A3 approaches its forward operative position so that during the latter part of such forward movement the push rod is arrested and moves rearwardly with respect to the hinged frame A3 to such extent as to close the contacts A47 and A49, but this movement of the push rod is insufficient to close the contacts A48 and A51. As hereinafter explained, the contact A49 is arranged in circuit with the winding of a magnet S2 which is energised to release a one revolution clutch incorporated in the transfer device S and thus initiate the operation of this device.

If, however, the "frozen" pointer N11 of the selected counting device N is disposed in its operative position, the corresponding stop N12 at the rear of the panel is disposed in the path of movement of the push rod A45 so that as the hinged casing A3 swings forwardly the motion of the push rod is arrested at an earlier stage and the increased relative movement of said push rod is sufficient to close contacts A48 and A51, as well as contacts A47 and A49. As hereinafter explained, the contact spring A51 is connected in circuit with the "frozen" magnet T16 of the printing mechanism of the transmitter so that under the conditions just described, this magnet is energised at this stage. The "frozen" stop N12 when disposed in its operative position also arrests the forward movement of the hinged casing A3 before the latter completes its full forward movement and before the driving pawls A27 of the actuating device operatively engage the respective driving gears of the selected counting device N.

Thus, although the said pawls are subsequently actuated in the usual way, they fail to operate the selected counting device.

*Selecting devices*

As previously stated, a selecting device V is employed to control the vertical movements of the actuating device A while a second selecting device H is provided to control horizontal movements of the carrier frame on which the actuating device is supported for vertical sliding movements. These selecting devices V and H are conveniently arranged below the panel P, as shown in Figures 2 and 4, but may be located in any convenient positions.

Figure 23:
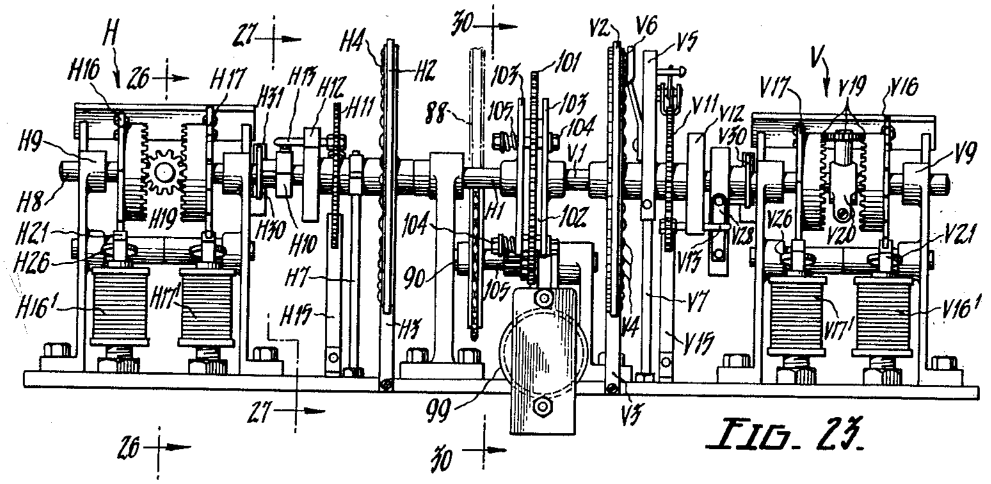
Figure 23 is a view in side elevation of selecting apparatus.
Figure 24:
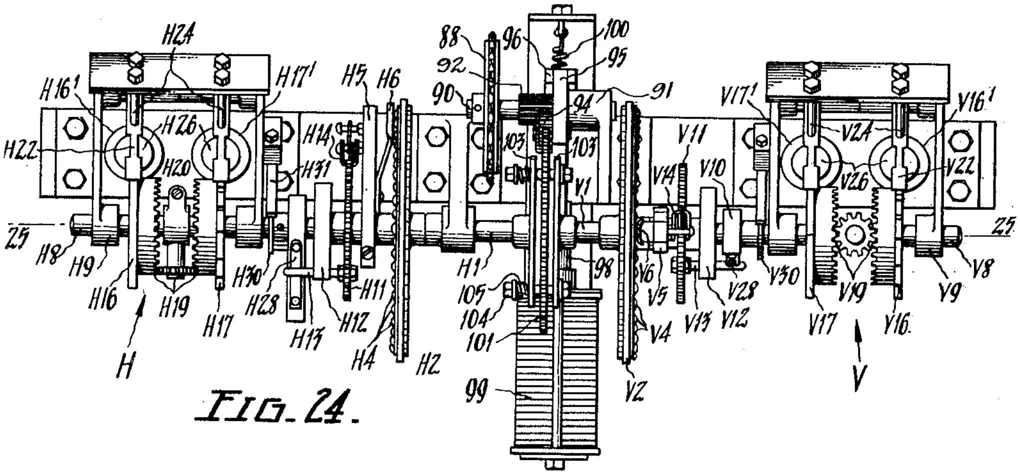
Figure 24 is a view in plan of the selecting apparatus shown in Figure 23.
Figure 25:
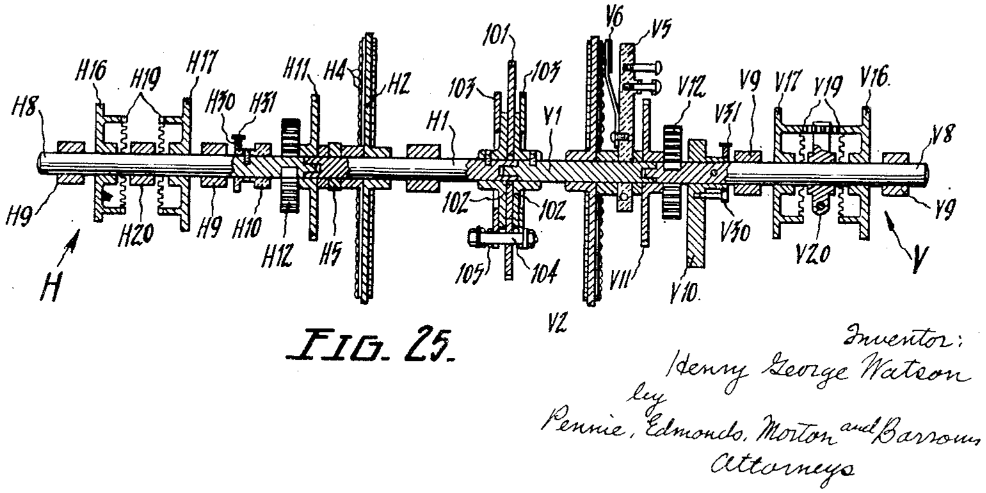
Figure 25 is a view in sectional elevation of the selecting apparatus and is taken on the line 25—25 of Figure 24.

In the illustrated embodiment the selecting devices are arranged coaxially on opposite sides of a common driving mechanism, as shown in Figures 23, 24 and 25.

More particularly the drive shaft 59 arranged below the panel is connected by chain and sprocket gearing 88 to a countershaft 90 rotatably supported in suitable bearings 91, such countershaft being fitted with a driving pinion 92.

Figure 30:
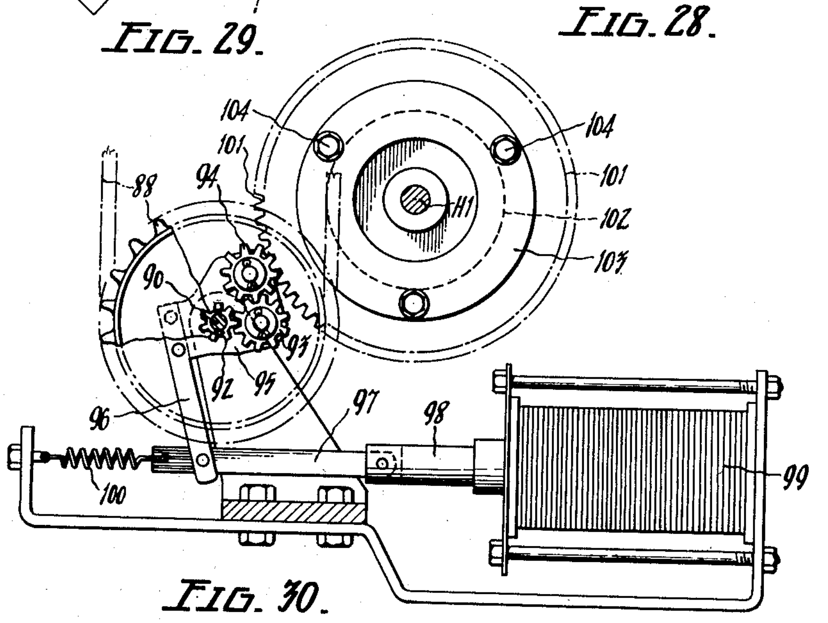
Figure 30 is a view of reversing gearing and is a section on the line 30—30 of Figure 23.

The pinion 92 is in constant mesh with a pinion 93 which in turn meshes with a pinion 94, these pinions 93 and 94 being rotatably supported on a rocker bracket 95 pivotally supported on the countershaft 90. Fig. 30.

The rocker bracket 95 is provided with a rigid arm 96 the outer end of which is connected by a pivoted link 97 to the plunger 98 of a reversing solenoid 99 whereby when the solenoid is energised the rocker bracket is angularly displaced in opposition to a tension spring 100.

When the reversing solenoid 99 is deenergised, which is its normal condition, the pinion 94 on the rocker bracket 95 is in mesh with the teeth of a gear wheel 101, as shown in Figure 30, while when the said solenoid is energised and the rocker bracket 95 is moved angularly to its other extreme position, the pinion 94 is disengaged from the gear wheel 101 while the pinion 93 which rotates in the opposite direction is moved into mesh with the said gear wheel. The gear wheel 101 is freely mounted on the abutting ends of two coaxially arranged drive spindles V1 and H1 respectively incorporated in the corresponding selecting devices and between a pair of friction discs 102 which are secured to the corresponding shafts V1 and H1. The friction discs 102 are in turn arranged between and in contact with the inner faces of a pair of friction retaining rings 103 which are connected together and to the gear wheel 101 by a plurality of bolts 104 arranged parallel to the common axis of the shafts, each of said bolts being fitted with a compression spring 105 whereby the whole assembly of retaining rings 103, friction discs 102 and centrally disposed gear wheel 101 are maintained in frictional contact. Thus when the gear wheel 101 is rotated in either direction by the means previously described, the spindles V1 and H1 will be rotated in unison therewith through the corresponding friction drives until the movements thereof are arrested by means hereafter described. In this connection it will be evident that when either the spindle V1 or the spindle H1 is arrested, the other spindle H1 or V1 respectively may continue to rotate until it in turn is arrested by appropriate means.

Now the mechanisms of the two selecting devices V and H respectively are substantially identical for which purpose it is sufficient to describe the horizontal selecting device H and to designate corresponding parts of the vertical selecting device V by the same reference numerals and the identifying letter V.

Thus the horizontal selecting device comprises a fixed contact carrying disc H2 arranged about the drive shaft H1 but retained against rotation by an arm H3 suitably secured to the frame of the apparatus. (See Fig. 27). This disc H2 is provided on one face thereof with a plurality of equally spaced contacts H4 arranged at a uniform distance from the axis of the spindle, each of these contacts H4 being electrically connected to a corresponding electro-magnet P1 on the panel frame P as hereinbefore described. A radial arm H5 secured to the drive shaft H1 is provided with a resilient contact strip H6 which when the shaft H1 is rotated in the direction of the arrow shown in Figure 27 passes in succession over and makes successive contact with the contacts H4 on the fixed disc H2. In the normal condition of the apparatus the arm H5 is in contact with a fixed stop H7 whereby the contact strip H6 thereon is disposed clear of but adjacent to the fixed contact H4 in circuit with the electro-magnet P1 at say the left hand end of the series thereof on the panel frame.

An escapement spindle H8, which is separate from but arranged coaxially with the spindle H1, is supported in suitable bearings H9 and a radial abutment arm H10 is secured to said spindle H8 adjacent to a ratchet disc H11 freely rotatable on the adjacent end of the spindle H1. A spiral spring H12 is arranged about the common axis of said spindles between the ratchet disc and said abutment arm H10 and has its inner end secured to the latter and its outer end secured to a stop pin H13 which projects laterally from the ratchet disc into the path of movement of the abutment arm, the teeth of said ratchet disc being engageable by a pawl H14 pivotally mounted on the switch arm H5. Thus the spring H12 tends to rotate the abutment arm H10 in the direction of the arrow shown in Figure 27 and to rotate the ratchet disc in the opposite direction, but such retrograde movements of the ratchet disc are prevented by a resilient retaining arm H15 secured to a fixed support.

A spaced pair of ratchet escapement discs H16 and H17 are freely mounted on the escapement spindle H8 and said discs are interconnected by differential gearing H19, the planetary pinion of which is rotatively supported on a carrier H20 secured to the said spindle.

Figure 26:
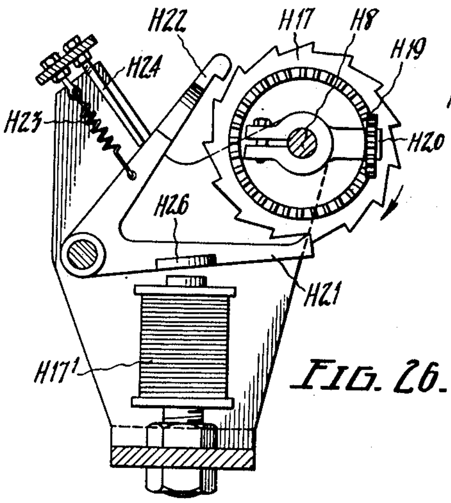
Figure 26 is a view in sectional end elevation taken on the line 26—26 of Figure 23 and is drawn to a larger scale.
Figure 27:
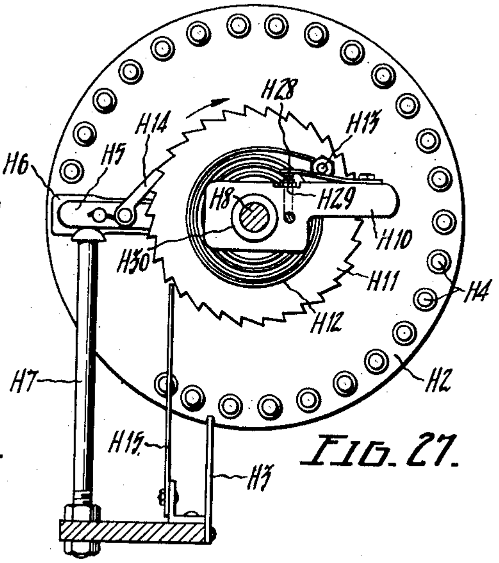
Figure 27 is a view in sectional end elevation taken on the line 27—27 of Figure 23 and is also drawn to a larger scale.
Figure 29:
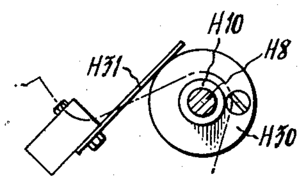
Figures 28 and 29 are views showing details of the selecting apparatus.
Figure 28:
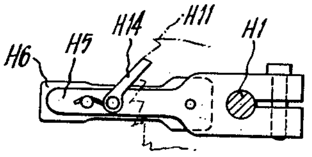

It will thus be evident from the preceding description that the carrier H20 of the differential gearing H19 is continuously urged in the direction of the arrows shown in Figures 26 and 27 by the spring H12 and that such movements may take place only if one or both of the ratchet discs H16 and H17 is or are permitted to move in the same direction.

The ratchet discs are, however, normally restrained against rotation in the specified direction by corresponding retaining arms H21 which are pivoted to fixed supports, and each of which is formed integrally with a second angularly disposed arm H22, the free end of which is formed with a tooth engaging hook normally disposed clear of the coacting ratchet disc.

Each pair of arms H21 and H22 is normally maintained in the described positions by means of a tension spring H23 and an adjustable stop H24 but is movable in opposition to said spring by energising a corresponding electro-magnet H16′ or H17′ which coacts with an armature H26 on the arm H21. Thus when either magnet H16′ or H17′ is energised the corresponding retaining arm H21 is disengaged from the coacting ratchet disc while the rigidly connected arm H22 is moved into the path of movement thereof whereby the ratchet disc is permitted to move under the influence of the spring H12 through an angle corresponding approximately to one half of the angle between each adjacent pair of teeth. When subsequently the electromagnet is deenergised the retaining arm H21 returns to its operative position whereby the coacting ratchet disc undergoes a further angular movement which is arrested when the succeeding tooth thereon engages the said arm H21.

Consequently if say four separate current impulses are transmitted to one of the electromagnets H16′ or H17′ the corresponding ratchet disc H16 or H17 respectively is moved by the spring H12 through an angle corresponding to that subtended by four teeth on said disc.

It will be evident that during any such movement the carrier H20 of the differential gearing and the abutment arm H10 rigidly connected thereto move in the same direction but through one half of the angle. If both ratchet discs are released simultaneously, the consequent angular movement of the carrier H20 and abutment arm H10 is equal to one half of the sum of the angular movements of said discs.

Now the angle subtended by adjacent teeth on the ratchet disc H17 is equal to twice the angle between adjacent contacts H4 on the fixed contact carrying disc H2 so that when one tooth of this disc H17 is permitted to escape the abutment arm H10 advances in the direction of the arrow through an angle equal to that subtended by any adjacent pair of the contacts H4.

The other ratchet disc H16 has fewer teeth so that when one tooth thereof is permitted to escape the abutment arm H10 advances through a correspondingly larger angle which may for example be six times as large as the angular movement resulting from the escapment of one tooth of the disc H17.

This construction is advantageous when as in the present apparatus each selecting device embodies a relatively large number of contacts H4 or V4, i. e. 25 contacts in the "horizontal" selector H (one for each vertical column of counting devices N on the panel P) and 40 contacts in the "vertical" selector V (one for each horizontal row of counting devices N).

Thus in order to advance the abutment arm V10 of the vertical selector through an angle corresponding to say the thirty-eighth contact V4, it is necessary merely to allow six teeth of the ratchet disc V16 and two teeth of the disc V17 to escape—that is to say the magnet V16′ controlling the high value disc V16 is energised and deenergised six times while the magnet controlling the low value disc V17 is energised and deenergised twice.

If on the other hand a single ratchet disc were employed it would be necessary to allow 38 teeth to escape so that 38 current impulses would have to be transmitted to the actuating electromagnet.

It will subsequently be explained that the required numbers of current impulses determined by the positions of the setting levers are transmitted to the pairs of electromagnets H16′, H17′ and V16′, V17′ during an initial portion of the operation of the transmitter T and that subsequently the driving motor MC of the controlled apparatus is energised.

Accordingly before the motor MC is energised, the abutment arms H10 and V10 of the horizontal and vertical selecting devices are advanced in the manner described to positions corresponding to the required fixed contacts H4 and V4.

When the motor MC is started the drive shafts H1 and V1 carrying the switch arms H5 and V5 respectively are rotated through the individual friction clutches previously described and in the same direction as that in which the respective abutment arms H10 and V10 were previously moved, the reversing solenoid 99 being at this time energised as hereafter explained. Such forward movements of the switch arms H5 and V5 continue until the stop pins H13 and V13 on the ratchet discs H11 and V11 respectively, which are constrained to move forwardly in unison with the said switch arms, engage and are arrested by the respective abutment arms H10 and V10 at which stages the respective friction clutches commence to slip, it being understood that either switch arm may move through a greater angle than the other before it is arrested.

At the conclusion of this operation the contact strip H6 on the switch arm H5 engages the fixed contact H4 for the required column of said counting devices and similarly with the contact strip V6. The required magnets P1 and C1 are thus finally energised while the intervening magnets P1 and C1 are momentarily energised as the corresponding switch arms are advancing to the required positions.

Now the abutment arm H10 is provided on one side thereof with an insulated contact strip H28 the free end of which is normally separated from an insulated contact H29, the latter being electrically connected to a conducting disc H30 secured to the abutment arm and constantly engaged by a resilient conducting strip H31 secured at one end to a fixed support.

The conducting strip H28 on the abutment arm is disposed in the path of movemnt of the stop pin H13 on the ratchet disc H11 so that as the latter is completing its forward movement the said conducting strip is pressed by the stop pin into engagement with the coacting contact H29 and such engagement is maintained as long as the corresponding friction clutch urges the drive shaft H1 forwardly. As hereafter more fully explained, these contacts when closed complete the circuit of the solenoid C13 or C14 to effect engagement of the friction clutch for the required direction of movement of the carrier frame.

Similarly, the contact members V28 and V29 when closed complete the circuit of the solenoid 78 or 79 to effect engagement of the friction clutch for the required direction of movement of the actuating device A.

It may here be remarked that as shown in Figure 27 the contact members H28 and H29 are separated when the switch arm H5 and abutment arm H10 occupy their normal inoperative positions, the fixed stop member H15 being appropriately located for this purpose.

It will also be explained hereafter that at a subsequent stage of operation and while the motor MC is still running the reversing magnet 99 is deenergised whereby the pinion 93 is disengaged from the gear wheel 101 and the pinion 94 is engaged therewith. Thus the shaft H1, together with the switch arm H5 thereon, is returned to its normal inoperative position but the ratchet disc H11 is prevented by the arm H15 from participating in this movement whereby the spring H12 is left in its fully wound condition.

*Transfer device*

The transfer unit S is also conveniently arranged below the panel P as shown in Figures 2 and 4 of the drawings and same comprises a frame S3 supporting two horizontally disposed spindles S4 and S5 arranged one above the other and a countershaft S6 disposed parallel thereto, the countershaft being connected by chain and sprocket gearing 106 to the drive shaft 59.

A toothed pinion S7 on the countershaft is in constant mesh with a gear wheel S8 freely mounted on the spindle S5 and forming the driving member of a clutch which is normally disengaged but which when operated as hereafter described allows the spindle S5 to make one complete revolution. Such clutch may therefore be conveniently termed a one-revolution clutch.

Figure 34:
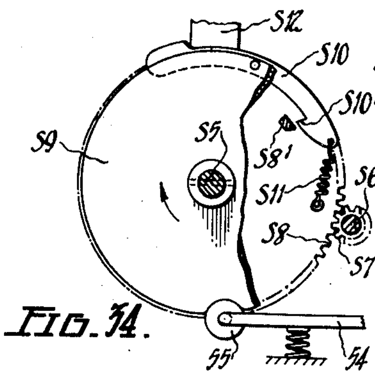
Figure 34 is a view in end elevation of clutch means incorporated in the transfer mechanism.

The driven element of this clutch is a disc S9 secured to the spindle S5 and having pivoted to its inner face and adjacent its periphery an arcuate transmission arm S10, such disc being normally located accurately in position by a spring pressed retaining arm S54 provided at its free end with a roller S55 which projects into an accommodating recess in the periphery of the disc. One end of the arm S10 is formed with a hook like projection S10′ which is urged into the path of a lateral projection S8′ on the gear wheel S8 by a tension spring S11, but which is normally maintained in its outward inoperative position in opposition to said spring by a trip arm S12 which engages the opposite end of the transmission arm as shown in Fig. 34.

The trip arm is rockably supported at its upper end on a rod S13 projecting laterally from the frame S3 while an intermediate portion thereof is disposed adjacent to the core of the aforesaid electromagnet S2.

A return arm S15 which also is rockably supported on the rod S13 adjacent the opposite end of the magnet S2 has its upper end connected to a tension spring S15′ whereby its lower end is normally maintained in contact with a cam S14 secured to the spindle S5. An abutment rod S16 is secured at one end to the trip arm S12 while the opposite end thereof extends slidably through a hole in the return arm S15 and is fitted with a collar S16′ disposed adjacent to the inner face of said arm.

Figure 33:
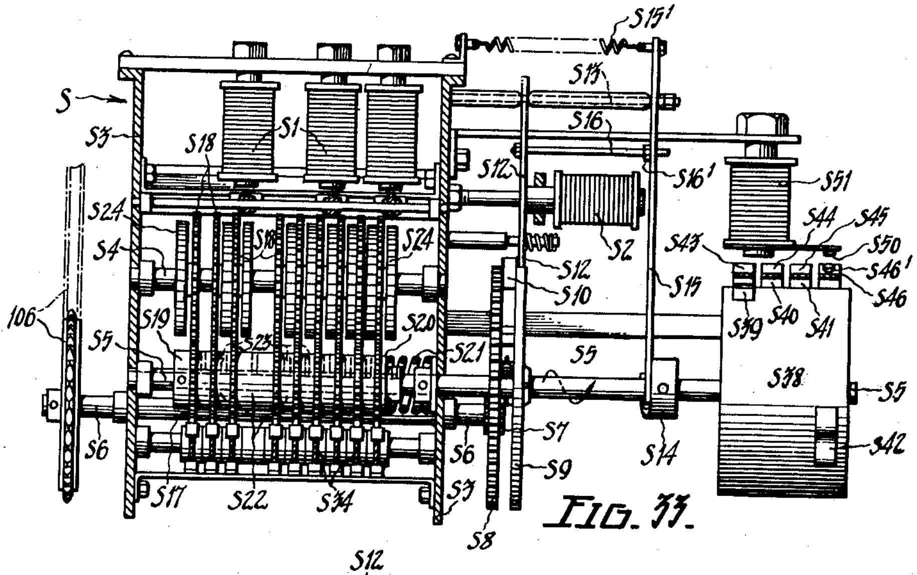
Figure 33 is a view in sectional side elevation of the transfer mechanism.
Figure 36:
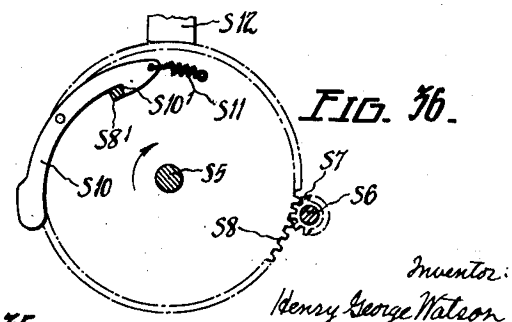
Figure 36 is a view similar to Figure 34 and shows the clutch in the operated condition.

Accordingly, when the magnet S2 is energised as hereafter described, the lower end of the trip arm is moved laterally to the position shown in Figure 33 thus disengaging the coacting end of the transmission arm S10 whereby the opposite end thereof moves into the path of the driving projection S8′ on the gear wheel S8, as shown in Figure 36. The clutch members are thus engaged and the spindle S5 commences to rotate. After the spindle S5 has moved through a portion of its movement, the cam S14 forces the lower end of the return arm S15 towards the magnet S2 and such movement is transmitted to the trip arm S12 by the abutment rod S16 so that said trip arm is positively returned to its initial position. The return arm S15 when moved to its operative position as described is retained therein by the magnet S2 until the latter is deenergised as hereafter described.

Accordingly, before the spindle S5 completes one revolution the trip arm reenters the path of movement of the rear end of the transmission arm S10 so that the latter is disengaged from the driving projection S8′ as the revolution is completed.

The spindle S5 freely supports a coaxially arranged series of toothed pinions S17, one for each number disc N5 of the counting devices N, each of said pinions being in constant mesh with a corresponding gear wheel S18 rotatably supported on the spindle S4.

The said group of pinions S17 is arranged between an abutment block S19 which is secured to the spindle S5 and a pressure disc S20 slidably supported on said spindle and urged towards the abutment block by a compression spring S21 while a friction disc S22 is slidably mounted on the spindle between each adjacent pair of pinions S17. The pressure disc S20 and the several friction discs S22 are constrained to rotate in unison with the spindle S5 by means of keys S23 which extend into a longitudinal keyway formed in the spindle.

Figure 31:
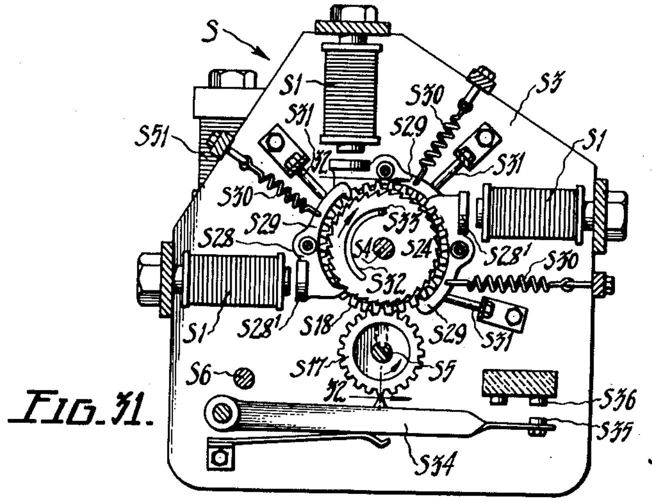
Figure 31 is a view in end elevation and partly in selection of transfer mechanism.

Thus the whole assembly comprising pinions S17, intermediate friction discs S22, pressure disc S20 and abutment block S19 is maintained under endwise pressure so that when the spindle S5 is driven in the direction of the relevant arrow shown in Figure 31 by the release of the abovementioned one-revolution clutch, each pinion is frictionally driven in unison therewith until further movements of said pinions are individually arrested as hereafter described. When any particular pinion is so arrested the friction drive members therefor slip thereover while the spindle S5 continues to rotate.

Each gear wheel S18 on the spindle S4 is arranged adjacent to a corresponding ratchet disc S24 having the same number of teeth and which also is rotatively supported on that spindle, each coacting pair of gear wheels and ratchet discs being connected together by an interposed spiral spring S25 which is maintained under tension at all times. For this purpose the outer end of each spring S25 is connected to an anchor pin S26 on the corresponding ratchet disc while the inner end of the spring is connected to an anchor pin S27 on the corresponding gear wheel S18.

Accordingly each ratchet disc is continuously urged in the forward direction of the upper arrow shown in Figure 31 while the coacting gear wheel S18 is continuously urged in the reverse direction but such reverse movements are at all times prevented by the aforesaid friction drive means for the corresponding pinions.

Likewise forward movements of each ratchet disc S24 are normally prevented by a corresponding pivoted retaining arm S28 which is rigidly connected to a normally disengaged check arm S29, said arms being maintained in their normal positions by a corresponding tension spring S30 and coacting fixed stop S31.

Each of the retaining arms S28 is formed with an armature S28′ disposed adjacent to the core of the corresponding electromagnet S1 hereinbefore referred to, whereby when said magnet is energised and then deenergised, the connected arms S28 and S29 undergo one forward and return movement and allow one tooth of the coacting ratchet S24 to escape.

Figure 32:
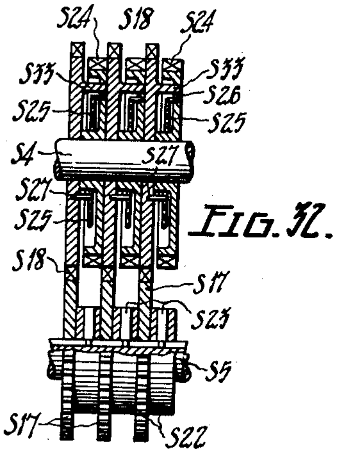
Figure 32 is a view in sectional elevation taken on the line 32—32 of Figure 31 of portions of the transfer mechanism and is drawn to a larger scale.

Each ratchet disc is formed with an arcuate slot S32 and a laterally projecting stop pin S33 on the associated gear wheel S18 projects thereinto and normally engages the forward end thereof, as shown in Figures 31 and 32, and it will be evident that the gear wheel cannot move forwardly beyond this position.

When the value setting levers T8 to T14 inclusive of the transmitter T are set and the transmitter is actuated as hereafter more fully described, the requisite numbers of current impulses are transmitted to the corresponding electromagnets S1 so that the requisite number of teeth of each ratchet disc S24 is permitted to escape—that is to say, each ratchet disc corresponding to an operated value setting lever moves forwardly through an angle corresponding to the position of the respective setting lever. Thus each operated ratchet disc moves in advance of the coacting gear wheel S18.

When subsequently the aforesaid one-revolution clutch is released, while the motor MC is operating, each of the gear wheels S18 is urged forwardly by the friction drive means associated with the corresponding pinion S17 so that the gear wheel associated with each ratchet disc which was previously permitted to escape is driven forwardly until the stop pin S33 on the gear wheel again engages and is arrested by the closed forward end of the slot S32 in the ratchet disc.

Accordingly both the gear wheel S18 and the coacting pinion S17 move forwardly through angles corresponding to the forward movement previously imparted to the associated ratchet disc.

Now the outer end of a tooth of each pinion S17 is normally engaged by a lateral projection on a spring pressed pivoted arm S34 mounted on the frame whereby a contact S35 on the free end of this arm is normally separated from a coacting fixed contact S36, each pair of such contacts being arranged in the circuit of the corresponding "value" solenoids A24 of the actuating device. Thus when a pinion S17 moves forwardly through an angle corresponding to one or more teeth thereof the circuit of the corresponding value solenoid A24 is made and broken a corresponding number of times. For example if five current impulses are imparted to one of the electromagnets S1 by operation of the transmitter, the corresponding ratchet disc S24 advances 5 teeth as hereinbefore described so that when subsequently the one-revolution clutch of the transfer device is released the coacting gear wheel S18 and pinion S17 each advance through five teeth and five current impulses are transmitted to the relevant solenoid A24 of the actuating device.

Accordingly the transfer device serves to register the current impulses received from the transmitter and at a later stage to transmit corresponding numbers of impulses to the actuating device.

In addition each of the electromagnets S1 other than that corresponding to the number discs N5 of lowest denomination are connected in circuit with the contacts A39 and A40 incorporated in the actuating device and corresponding to the number disc N5 of next lower denomination. Accordingly, when each number disc N5 is passing from the "9" to the "0" position or vice versa, a current impulse is transmitted to the electromagnet S1 corresponding to the number disc of next higher denomination whereby a further tooth of the associated ratchet disc S24 is permitted to escape whereby the corresponding gear wheel S18 and pinion S17 will also move forwardly through one additional tooth space before their motions are arrested and an additional current impulse is transmitted to the corresponding solenoid A24.

A drum S38 secured to one end of the spindle S5 of the transfer device is provided on its periphery and in different planes of rotation with four switch operating projections S39, S40, S41 and S42 respectively, each of said projections being engageable with a coacting projection on a corresponding switch arm S43, S44, S45 and S46 respectively pivoted to the frame. The said projections on the pivoted arms are normally disposed in contact with the periphery of the drum S38 whereby contacts S43', S44' and S45' respectively thereon are normally disposed in engagement with coacting fixed contacts S47, S48 and S49 respectively, while the contact S46' is normally disengaged from a coacting fixed contact S50. Accordingly each of the said pivoted switch arms is raised by the corresponding projection on the drum S38 at an appropriate stage during the rotation thereof to open or close the corresponding contacts.

Each of the switch arms S43 and S44 is provided intermediate its ends with an armature arranged below the core of an electromagnet S51 supported on the frame of the transfer device. This magnet when energized is not sufficiently powerful to raise the switch arms S43 and S44, but is provided to retain said arms in their upper positions when same are lifted by the corresponding projections S39 and S40 on the drum S38.

Coacting contacts S43' and S47 are in the aforesaid holding circuit of the solenoid A5 for operating the hinged frame A3 of the actuating device, contacts S44' and S48 are in the circuit of the solenoid 99 incorporated in the reversing gearing to the selector devices H and V; contacts S45' and S49 are in circuit with the holding magnet S51 and with two holding magnets in the transmitter as hereinafter described, while contacts S46' and S50 are in circuit with the printing solenoid T85 in the printing mechanism of the transmitter.

*Transmitting apparatus*

As shown in Figure 45 the transmitter T is provided with a casing T17 which encloses the mechanism and incorporates a platform T18 arranged partly below a horizontal slot T19 and on which order forms or the like may be supported to be printed with particulars of the operations performed, the printing mechanism being located within the portion T17' of the casing above said slot T19.

The apparatus enclosed within the casing incorporates a main frame T20 which rotatively supports a transversely arranged spindle T21 on which the panel discriminating lever T2, the selecting levers T4 . . . T7 and the value setting levers T8 . . . T14 for the counting devices are freely mounted and such levers project through corresponding slots in the casing T17.

It may be here noted that whereas the transmitter is shown as having seven value setting levers T8 to T14 inclusive, the counting device N are shown as including nine number discs N5, while the actuating device A is likewise provided with nine actuating arms A21. The reason for this is that usually the total value which a counting device may be required to indicate would be considerably greater than the total value to be added or subtracted in a single operation.

Figure 35:
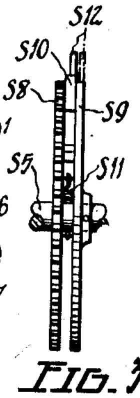
Figure 35 is a view in side elevation of the clutch means.

The spindle T21 also rotatively supports a worm wheel T22 which meshes with a worm T23 on the spindle of the motor MT enclosed within the casing. A one revolution clutch generally designated T24, which may be similar in construction to the aforesaid clutch (Figures 34, 35, 36) of the transfer device, is interposed between the spindle T21 and the worm wheel T22 which may constitute the driving member of the clutch the driven disc T24' thereof being secured to the spindle T21. The said clutch includes a laterally movable trip arm (not shown) which is moved in one direction in opposition to a spring $T24^2$ to allow the coacting clutch members to interengage as previously described and is returned to its initial position by said spring to cause disengagement of said clutch members as the spindle completes one revolution.

The starting lever T1 is pivotally connected at T25 to the transmitter frame and the depending lower portion of said lever is arranged to displace said trip arm laterally to permit engagement of the clutch elements as said starting lever is moved to its operative position. The starting lever T1 is automatically returned to its normal inoperative position, shortly after the spindle T21 commences to turn, by a laterally projecting pin T37 on the driven disc T24'.

The lower end of the starting lever T1 is also pivotally connected to the forward end of a bar T26 which is slidably supported adjacent its rear end by a bracket T27 whereby as the upper end of the starting lever is moved forwardly to its operative position, the slide bar is moved rearwardly.

One edge of the slide bar T26 is slotted forwardly of the bracket T27 to form an inclined abutment T26' for a projection T29' on the back of an armature T29 which is pivotally connected adjacent its lower end to the frame T20, such projection being maintained in contact with the inclined abutment by a tension spring T31 connected to an upper portion of the armature.

The upper end of the pivoted armature is fitted with an insulating block T32 which supports two contacts T33 and T34 respectively, such contacts being normally spaced from but arranged to engage coacting contacts T35 and T36 respectively.

The contacts T33 and T35 are in the circuit of the driving motor MT while the contacts T34 and T36 when closed complete two parallel circuits one of which includes the electromagnet T30 while the other includes the aforesaid solenoid 99 for reversing the mechanism for driving the vertical and horizontal selecting devices.

When the starting lever T1 is moved to its operative position as shown in Figure 47, the armature T29 is displaced in opposition to the spring T31 to close the coacting pairs of contacts T33, T35 and T34, T36. Thus the circuits of the driving motor MT and of magnet T30 are closed.

The magnet 30 when energised retains the armature in its operated position and thus maintains closed its own circuit and that of the driving motor when the starting lever is returned to its inoperative position by a pin T37 on the driven disc T24' of the one revolution clutch.

A resilient locking arm T28 is screwed at its lower end to and is spaced from the back of the pivoted armature T29 whereby the slide bar T26 extends therebetween. When the armature is disposed in its normal inoperative position this resilient locking arm T28 is disposed clear of the adjacent edge of the slide bar and in alignment with a slot $T26^2$ therein but when the armature is moved to its operative position the locking arm bears resiliently thereagainst as shown in Figure 47 the said slot $T26^2$ being out of register therewith.

When however the starting lever T1 and slide bar T26 are returned to their inoperative positions as hereinbefore described the locking arm T28 enters the slot $T26^2$ and so prevents a further actuation of the starting lever while the magnet T30 is energised.

The panel discriminating lever T2 carries a resilient contact T38 which may be moved over an arcuate series of fixed contacts T39, one for each of the panels P controllable by the transmitter and the circuits of which are hereinafter described. When the transmitter is required to operate only one panel this lever T2 is not required.

Attached to the lever T2 is an arcuate indicator strip T45 having its center of curvature at the axis of the lever T2 and provided on its upper face with suitably spaced characters T46 which identify the several panels and which may be moved successively into register with an inspection opening T47 in the casing. Thus when the contact T38 on the lever T2 is engaged with any particular fixed contact T39 the character T46 designating the panel P corresponding to such contact T39 is exposed by the inspection opening T47.

Similarly each of the setting levers T4 to T14 inclusive is provided with an arcuate indicator strip T45 bearing numerals or other position identifying indicia T46 which may be successively exposed at openings T47 in the casing.

Each of the selector setting levers T4 . . . T7 and value setting levers T8 . . . T14 is provided with a laterally projecting contact strip T43 and with a coacting resilient contact strip T44, such contact strips being provided with coacting normally open contacts designated $T4^1$ and $T4^2$, $T5^1$ and $T5^2$—and so on.

An actuating arm T48 pivotally mounted on each of the setting levers T4 to T14 inclusive engages the corresponding resilient contact strip T44 and the former has an integral projection T48' which coacts with a corresponding toothed segment T49 secured to the spindle, each such segment being provided with a plurality of teeth and having plain portions T49' at the ends of the respective group of teeth thereon. More particularly each of the segments T49 associated with the value setting levers T8 to T14 inclusive is provided with nine equally spaced teeth, while the segments associated with the selector setting levers T4 to T7 inclusive may have fewer teeth.

When any particular setting lever is disposed in its normal position at which the zero indication T46 is displayed through the corresponding inspection T47 the projection T48' on the associated actuating arm T48 bears against the plain upper portion T49' of the corresponding toothed segment T49. Likewise if the setting lever is moved forwardly to display the numeral "2" through the inspection opening the projection T48' projects into the tooth space in advance of the 2nd tooth from the top of the segment, as shown in Figure 49. During this forward movement of the setting lever the actuating arm T48 is moved upwardly as it passes over each of the two uppermost teeth on the segment and during each such upward movement the resilient contact strip T44 is pressed into engagement with the coacting contact strip T43, but as the circuit containing these contacts is open at another place at this stage, actuation of the resilient contact strip T44 is without effect at this time.

After the various setting levers have been arranged in the requisite positions the starting lever T1 is operated as above described, and as already explained the spindle T21, to which the toothed segments T49 are secured, is then caused to undergo one complete revolution. During an initial portion of this revolution those teeth of each segment T49 which are disposed above the projection T48' on the associated actuating arm T48 operate said arm in succession whereby the contact members on the arms T43 and T44 are closed and opened a corresponding number of times and during each such closure a corresponding electromagnet is energised. Thus for example as the segment T49 undergoes one revolution from the position shown in Figure 49, the uppermost pair of teeth thereon cause two current impulses to pass through the circuit of the corresponding magnet.

It will be evident that those teeth of each segment which are initially disposed below the projection T48' on the arm T48, actuate the latter during the final stage of the revolution of the spindle T21, but the consequent operation of the contact member T44 is without effect because as hereinafter explained the appropriate circuit is previously interrupted by the contact T50.

Thus each of the contacts T4' . . . T14' on the respective contact strips T43 is electrically connected to a corresponding resilient contact $T4^3$ . . . $T14^3$ arranged adjacent to but normally spaced from a common coacting contact T50 on a pivoted arm T51, such arm carrying a roller T52 which is normally received in a recess T53 in the periphery of a cam disc T54 secured to the spindle T21. (See Figures 50 and 51.)

Thus as the spindle T21 commences to make one complete revolution the roller T52 passes out of the recess T53 onto a concentric high portion T54' of the cam disc T54 whereby the common contact T50 is moved into simultaneous engagement with all of the resilient contact strips $T4^3$ . . . $T14^3$ thereby preparing the respective circuits for the contacts $T4^1$, $T4^2$ . . . $T14^1$, $T14^2$.

The high portion T54' of the cam T54 extends around a comparatively small portion of the cam and when the roller T52 passes therefrom onto the low portion thereof, the common contact T50 is again separated from the coacting contacts $T4^3$ . . . $T14^3$.

The high portion T54' of the cam, however, subtends a greater angle than the groups of teeth on the segments T49 so that the maximum number of current impulses which the apparatus is designed to transmit may be imparted to the respective electromagnets before the circuits thereof are interrupted by the return of the common contact T50 to its normal position shown in Figure 50.

A pin T95 projects laterally from the cam disc T54 whereby as the latter rotates it will depress one end of a pivoted lever T96 supporting an insulating block T97 carrying two contacts T98 and T99 respectively, such contacts being normally separated from coacting fixed contacts T100 and T101 respectively. The normally raised end of the lever T96 is disposed adjacent to the core of an electromagnet T102 which was previously energised in series with the magnet T30, whereby the lever T96 will be retained in its operated position with the aforesaid coacting contacts closed, when same is moved to such position by the pin T95.

The contacts T98 and T100 are in the circuit of the motor MC for driving the controlled apparatus while the contacts T99 and T101 are in circuit with the "addition" switch T3' of the transmitter and the "addition" solenoid A36 of the actuating device.

The starting lever T1 is interlocked with the various setting levers T2 and T4 to T14 inclusive whereby said starting lever cannot be moved from its inoperative position unless each of said levers T2 and T4 to T14 inclusive is so arranged that one of the respective characters T46 is properly located within the corresponding inspection opening T47 and whereby all of such levers are locked in position when the starting lever is operated. Figures 46, 47 and 48.

For this purpose a locking arm T56 individual to each of said levers T2 and T4 to T14 inclusive is pivoted about a vertical axis to a transverse rail T57 secured to the frame of the apparatus while its forward end is slidably supported on a second rail T58. The free forward end of each locking arm projects laterally and is maintained in contact with the adjacent edge of the coacting indicator strip T45 by a tension spring T60 connecting the arm T56 to the frame while lateral displacement of the indicator strip is prevented by a guide pin T61 on the opposite side of the latter. The free end of each locking arm is receivable within any one of a series of equally spaced notches T45' having inclined sides and formed in the adjacent edge of the coacting indicator strip, such notches being so spaced that when any of the characters T46 is correctly displayed through the corresponding inspection opening T47, the said free end of the arm T56 extends into a corresponding notch. When such notch is moved out of register with the free end of the locking arm a small angular movement is imparted to the latter.

A further locking arm T62 which also is pivotally connected to the rail T57 and is slidably supported on the rail T58 is provided with a laterally projecting locking pin T63 which is in register with a hole T64 in the starting lever when the latter is in its normal inoperative position and a tension spring T68 connected to the arm T62 tends to maintain the locking pin T63 in its disengaged position.

A coupling link T65 pivoted at one end to the locking arm T62 has a limited lost motion connection with each of the locking arms T56 for which purpose a pin T67 projects upwardly from each arm T56 into a corresponding clearance hole T66 in the coupling link, the clearance so provided being such that when the pin T63 is in locking engagement with the starting lever any of the locking arms T56 may be moved angularly into and out of engagement with the corresponding notches T45' without displacing the coupling link.

When, however, the free end of any of the locking arms T56 bears against the side of the coacting indicator strip T45 between the notches therein, the locking arm T62 is retained in its operative position. Thus a notch T45' must be disposed in register with each of the locking arms T56 before the locking arm T62 is moved to its inoperative position by the spring T68 to permit of operation of the starting lever T1.

Finally when the starting lever is moved to its operated position the hole T64 herein is moved out of alignment with the then disengaged locking pin T63 which then rides on the adjacent face of the starting lever whereby all of the locking arms T56 are locked in their operated positions to prevent movement of any of the levers T2 and T4 to T14 inclusive.

In order to prevent movement of any of the levers T2 and T4 to T14 inclusive after the starting lever T1 has returned to its inoperative position and before the operation initiated thereby has been completed, a blanking plate T104 is arranged to slide over the face of the starting lever such plate being normally disposed clear of the hole T64 therein. This blanking plate is carried on the forward end of a slide T105 and the rear end of which is so connected by a bell crank lever T106 to the pivoted armature T29 that when the latter moves to its operated position the blanking plate is moved forwardly to obstruct the hole T64 and so prevent entry of the pin T63 on the arm T62. Thus as the magnet T30 is not deenergised until the conclusion of the whole operation as hereafter explained, the various setting levers are locked in their adjusted positions until that time.

The lever T3 for discriminating between "addition" and "subtraction" operations is operatively connected to any convenient type of switch T3' which, as previously explained, is arranged in the circuit of the "addition" electromagnet A36 of the actuating device A, such contacts being open when the lever T3 is set for subtraction operations.

Preferably the said lever T3 is also associated with interlocking means which prevent alteration of its position while the apparatus is in operation. As shown diagrammatically in Figure 48 such means may comprise a slidable bar T107 pivotally connected at one end to the upper end of the pivoted armature T29 and provided at its opposite end with a member T108 which moves into the space between the two extreme positions of the lever T3 when said armature is moved to its operative position.

*Printing mechanism of transmitter*

The printing mechanism comprises a coaxially arranged series of discs T70, each of which is freely rotatable on a transverse spindle T71, one such disc being provided for each of the levers T2 and T4 to T14 inclusive. Each of these discs T70 is provided on its periphery with a plurality of equally spaced projecting type elements T70' which correspond to the characters T46 on the indicating strips T45 associated with the corresponding setting lever. Thus each of the discs T70 corresponding to the value setting levers bear the type numerals "0" to "9" inclusive.

Each disc T70 is provided at one side thereof with a driving pinion T72 which is in constant mesh with a corresponding toothed segment T73 freely supported on a second transverse spindle T74, each segment having an upstanding arm T73' connected by a link T75 to an arm T76 on one end of a spindle T77, the opposite end of which carries a second arm T78 which is connected by a link T79 to the corresponding setting lever.

Thus when any of the setting levers is moved to a required adjustment position, the corresponding printing disc T70 is moved in unison therewith so that that printing character which corresponds to the position of the setting lever is moved to its lowermost position at which it is disposed above a vertically movable impression block T80 arranged to be moved upwardly through an opening in the platform T18.

An inked ribbon T81 guided by rollers T82 extends below the printing discs and above the platform on which the order form or the like to be printed is placed and located by a pointer T83 on the casing before the starting lever T1 is operated. Conventional means as illustrated are preferably provided for moving the ribbon in forward and reverse directions.

The impression block T80 is carried on a pivoted arm T84 which normally rests on a spring loaded plunger T84' the movement of which is limited by a stop $T84^2$. The free end of the lever T84 is connected to the plunger of a printing solenoid T85 whereby when this solenoid is energised the arm is moved downwards in opposition to the spring loaded plunger. When the solenoid is subsequently deenergised the arm is projected upwardly by the spring loaded plunger and the momentum so imparted to the impression block causes it to continue to move upwardly into engagement with the printing discs after the motion of the plunger has been arrested.

Another printing disc T92 arranged coaxially with the discs T70 is provided on its periphery with two appropriate type characters T92' such as the symbols "+" and "−" and this disc T92 is connected to the lever T3 by means which include a link T93 whereby when the latter is moved from one position thereof to the other the appropriate character T92' is moved to the printing position.

Three additional normally inoperative printing discs T86 are arranged coaxially with the printing discs T70 and T92 but are somewhat larger in diameter than the latter, such discs T86 being conveniently arranged one at each end and one at the center of the whole group of the discs T70 and T92. Each disc T86 is provided on its periphery with one projecting type character T86' and same may for example comprise the letters "F," "Z" and "N" respectively and corresponding to an abbreviation of the word "frozen." Such projecting type characters are arranged adjacent to flat sides $T86^2$ on the respective discs T86, such flat sides being normally disposed horizontally immediately above the impression block as shown in Figure 56 so that the lowermost type characters T70' on the discs T70 and T92 project therebelow.

Each of the printing discs T86 is movable angularly by a corresponding toothed segment T87 freely supported on the spindle T74, the several segments T87 being coupled together by a rod T88 whereby they are operable in unison. One of these segments T87 is provided with an upstanding arm T87' which is coupled by a link T89 to an arm on a spindle T89' to which is secured an armature T90 arranged adjacent to the "frozen" magnet T16 which, as previously explained, is in circuit with the normally open contacts A48 and A51 of the actuating device. Thus if these contacts are closed when the hinged frame A3 of the actuating device is swung forwardly to its operative position, the "frozen" magnet T16 in the transmitter is energised whereby the three segments T87 are displaced in unison to move the printing characters T86' on the printing discs T86 into the operative position shown in Figure 54. Accordingly as these type members T86' are now disposed below the level of those type members T70' on the printing discs T70 which are arranged in the printing position, it will be evident that when the impression block T80 is subsequently operated the letters "F," and "Z," "N" only, are printed on the order form.

Thus the transmitter operator is made aware that the goods corresponding to the selected indicating device N are "frozen," while as previously explained such indicating device is not actuated under these conditions.

Figure 55 is a view in inverted plan showing the printing discs T86 disposed in their operative positions and showing also the positions of the remaining printing discs when the transmitter is set as hereafter described for subtraction of the value "376."

*Electric circuits and general operation*

It has previously been explained that the panel discriminating unit D of the controlled apparatus and the panel selecting lever T2 of the transmitter are required only when more than one panel and/or transmitter are interconnected and Figure 57 shows the electrical connections when only one transmitter and one panel and appurtenant apparatus are provided.

It will now be assumed that it is desired to subtract the value "376" from that counting device N which is located in the 38th row from the bottom thereof on the panel P and in the 19th column of such devices commencing from the left hand end of the panel as viewed from the back. It will also be assumed that the value displayed by said counting device before the subtraction operation is performed is "0010922" whereby after such operation the value displayed will be "0010546."

It is further assumed that at the commencement of the operation, the actuating device is disposed below the said 38th row and to the right of the 19th column.

Accordingly the lever T3 of the transmitter is set to the "subtraction" position, while the "vertical" and "horizontal" selecting levers T4 to T7 are set to select the required counting device N and the value setting levers T12, T13, and T14 are set for the value "376" to be subtracted.

The selecting levers T4 to T7 inclusive are set to predetermined code numbers which identify the required counting device N. Thus in the particular apparatus described and illustrated one current impulse in the circuit associated with either of the levers T4 and T6 causes the rotary switch arm V5 or H5 respectively of the corresponding selecting unit to be advanced over six of the coacting contacts V4 or H4 in the respective bank thereof, while one current impulse in the circuits associated with the levers T5 and T7 cause the corresponding rotary switch arm to move one step onto the adjacent contact V4 or H4.

Thus in order to select the 38th row the setting levers T4 and T5 are set to display the numerals "6" and "2" respectively, while similarly the setting levers T6 and T7 are set to display the numerals "3" and "1" respectively.

As each of the levers T3 and T7 inclusive and T12, T13 and T14 is moved to the requisite position, the corresponding printing disc is moved to corresponding position and at this stage the order form or the like to be printed is inserted in the printing device of the transmitter.

The starting lever T1 is then operated whereby, as previously explained, contacts T33 and T34 are moved into engagement with contacts T35 and T36 respectively. Contacts T33 and T35 close to complete the circuit of the transmitter driving motor MT from the supply conductors L1 and L2 so that this motor commences to run while contacts T34 and T36 close to complete two parallel circuits from a battery B shown at the bottom of the diagram.

One of these circuits may be traced from the positive terminal of the battery, supply conductor 109 and conductor 110 to normally closed contacts S49 and S45' of the transfer device S, electromagnet S51, conductor 111, electromagnet T102 in the transmitter, conductor 112, electromagnet T30 and closed contacts T36 and T34 to earth. The last mentioned electromagnet is energized to maintain said pairs of contacts T33, T35 and T34, T36 in the closed condition when the starting lever is returned to its inoperative position while, as previously explained, the electromagnets T102 and S51, though energised, are without effect at this time.

The other circuit through the said contacts T34 and T36 extends from the positive terminal of the battery B through conductors 109 and 110 to the normally closed contacts S48 and S44' of the transfer device, conductor 143 to electromagnets 84 which are arranged in parallel, conductor 113 to the reversing solenoid 99 and conductor 114 to the said closed contacts T36 and T34. As previously explained the solenoid 99 when energised operates the reversing gearing included in the common drive means for the "vertical" and "horizontal" selectors whereby when the driving motor MC of the controlled apparatus is subsequently energised, the switch arms V5 and H5 will be driven in the forward direction. The magnets 84 when energised frictionally engage the coacting friction discs on the drive spindles for the actuating device A and carrier C as previously described with reference to Figures 10 and 11.

When the starting lever was moved to its operative position it also released the one-revolution clutch T24 of the transmitter and as the transmitter motor MT was simultaneously energised, the spindle T21 of the transmitter is caused to make one complete revolution as previously explained. During the initial portion of such rotation the cam T54 on the spindle moves the earthed contact member T50 into engagement with the contacts $T4^3$ to $T14^3$ inclusive, and such contact is maintained during approximately the first 60° of the rotation, at the conclusion of which said contact member T50 returns to its normal disengaged condition.

While said contact member T50 is in the engaged position, however, each pair of normally open contacts associated with the operated setting levers T4 to T7 inclusive and T12, T13 and T14 is closed and opened one or more times, the number of operations of each pair thereof being the same as the number displayed by the corresponding indicator T45 in the transmitter.

Thus for example, as it has been assumed that the selector lever T4 has been set to the number "6" the contacts $T4^1$ and $T4^2$ are closed and opened six times while the contact T50 is in the operated position whereby six current impulses are passed through the escapement magnet V16' of the vertical selector V. Thus six teeth of the coacting ratchet disc V16 are permitted to escape while as the setting lever T5 is set to display the number "2," the magnet V17' is energised twice and two teeth of the ratchet disc V17 escape. As the escape of each tooth of the ratchet disc V16 causes the corresponding abutment arm V10 to move through the angle subtended by six of the contacts V4 on the fixed disc V2, such abutment arm moves through the angle subtended by thirty-eight of the contact V4 when six teeth of the ratchet V16 and two teeth of the ratchet V17, escape.

Similarly the abutment arm H10 is moved through the angle subtended by nineteen of the contacts H4 on the fixed disc H2.

As an example, the circuit of the magnet V16' may be traced from the supply conductor 109, conductor 115, magnet V16', conductor 116, contacts $T4^1$, $T4^2$, conductor 117, and contacts $T4^3$ and T50 to earth.

Similarly the operation of the contacts associated with the operated value setting levers T12, T13 and T14 intermittently close the circuits of the corresponding magnets S1 of the transfer device so that each of the associated ratchet discs S24 is permitted to escape and move forwardly, the number of teeth so permitted to escape being equal to the value for which the respective setting lever is adjusted. Thus for example as the lever S12 has been set to the value "3" the corresponding magnet is energised and deenergised three times and three teeth of the associated ratchet disc S24 are permitted to escape.

The circuit of the magnet S1 corresponding to the setting lever T12 may be traced from the supply conductor 109, conductor 118, normally closed contacts A13 and A16 operated by the actuating solenoid A5 for the hinged casing A3 of the actuating device, conductor 119, the appropriate magnet S1, conductors 120 and 121 to contacts $T12^1$ and $T12^2$, conductor 122 and contacts $T12^3$ and T50.

During the rotation of the spindle T21 of the transmitter the pivoted lever T96 is moved to its operated position by the pin T95 on the cam disc T54 and as the associated electromagnet T102 is at this time energised as already explained, said lever is retained thereby in the said operated position in which the contacts T98 and T99 engage the coacting fixed contacts T100 and T101 respectively.

Contacts T98 and T100 in closing, complete the circuit of the driving motor MC of the controlled apparatus which thus commences to run while contacts T99 and T101 are in circuit with the "addition" switch T3' of the transmitter and the "addition" magnet A36 of the actuating device. However as the particular operation being described is one of subtraction, the switch T3' is open as shown in the diagram so that the closing of contacts T99 and T101 is without effect.

When the motor MC is started as above explained motion is imparted from the common drive shaft 59 to the aforesaid reversing gearing and friction clutches arranged between the "vertical" and "horizontal" selecting devices V and H respectively to the respective drive shafts V1 and H1 thereof. (Figures 23, 24 and 25.)

As previously stated, the said reversing gearing was moved to the forward drive position when the solenoid 99 was energised. The switch arms V5 and H5 respectively secured to the drive shafts V1 and H1 are thus moved forwardly over the respective banks of contacts V4 and H4 from the normal inoperative positions shown in Figure 27.

As each of the switch arms V5 and H5 pass over each contact in the respective bank thereof the corresponding magnet C1 or P1 is momentarily energised.

Thus, the circuit of any of the magnets P1 may be traced from the supply conductor 109 through conductors 123 and 124 to the switch arm H5 of the horizontal selector, the appropriate contact H4 in the bank thereof then through the conductor 125, and the corresponding magnet P1 to earth.

Now it has previously been assumed that at the commencement of the operation the actuating device is located below the 38th row of counting devices N and to the right of the 19th column thereof. It may thus be assumed that the actuating device is originally located in register with that counting device N which is located in the 20th row from the bottom and the 22nd column from the left of the panel.

When the switch arm V5, in moving forwardly as described, engages the 19th contact V4 in the bank thereof the magnet C1 corresponding to the 19th row of counting devices is momentarily energised. As the actuating device is at this time in register with the 20th row of counting devices, the pivoted armature A64 thereon is in register with the said magnet C1 for the 19th row. Thus as the lastmentioned magnet is momentarily energised the said armature A64 is attracted thereby and the associated contacts A68, A71 are momentarily closed. These contacts are in circuit with the "down" direction relay V35 which is thus momentarily energised, such circuit extending from the supply conductor 109 through conductor 126 the winding of magnet V35, conductor 140 and closed contacts A71, A68 to earth.

However, as hereinafter explained, the switch arm V34 is left, at the conclusion of each operation of the apparatus, in circuit with the clutch operating solenoid 78 for "down" direction movements of the actuating device, while similarly the switch arm H34 is left in circuit with the clutch operating solenoid C13 for effecting movements of the carrier frame C to the left hand of the panel as viewed from the rear of the latter.

Accordingly as the switch arm V34 is already in the corresponding position this momentary energisation of the "down" direction relay V35 is without effect.

The rotating switch arm V5 passes from the 19th contact V4 to the 20th contact whereby the magnet C1 for the 20th row of counting devices is momentarily energised and the contacts A67, A70 are momentarily closed. These contacts are in circuit with the vertical locating magnet A60 and with normally open contacts 85, 86 and as these latter contacts are still open, the momentary closing of contacts A67, A70 is without effect.

The switch arm V5 then passes onto the 21st contact in the bank thereof and momentarily energises the magnet C1 for the 21st row. This magnet is at this time in register with the pivoted armature A62 on the actuating device so that the corresponding contacts A66, A69 are momentarily closed. These lastmentioned contacts close to complete the circuit of the "up" direction relay V36 which is thus energised to move the switch arm V34 into circuit with the operating magnet 79 for the "up" direction friction clutch in the aforesaid means for imparting vertical movements to the actuating device. Thus the circuit of the magnet 79 is prepared for subsequent operation as hereinafter described.

The forward motion of each switch arm V5 and H5 continues until it is eventually arrested by the corresponding abutment arm V10 or H10 which was preset in the manner already described and when so arrested the switch arm V5 is in engagement with the 38th contact V4 while the switch arm H5 is in engagement with the19th contact H4, the corresponding magnet C1 and P1 on the carrier frame C and panel P respectively being thus energised.

As the motion of each switch arm V5 and H5 is arrested, the associated pair of normally open contacts V28 and V29 or H28 and H29 on the respective abutment arm V10 or H10 is closed in the manner previously explained with reference to Figure 27 of the drawings.

The contacts V28 and V29 are in circuit with the switch arm V34 which, as already explained, has been moved into circuit with the "up" direction clutch operating solenoid 79 of the vertical drive means for the actuating device A. Likewise the contacts H28 and H29 are in circuit with switch arm H34 which in turn is in circuit with the solenoid C13 for operating the aforesaid friction clutch by means of which the carrier C and actuating device A are moved to the left on the panel.

It may here be noted that as the actuating device was at the commencement of the operation located in register with the 22nd column of counting devices, none of those three magnets P1 then in register with the pivoted armatures C15, C16 and C17 are energised as the switch arm H5 moves forwardly into engagement with the 19th contact H4 as above described.

Accordingly contacts V28 and V29 close to complete the circuit of "up" direction solenoid 79, such circuit being traced from the supply conductor 109 through conductor 126 to the closed contacts V28 and V29 and switch arm V34 to solenoid 79 and thence to earth. Similarly contacts H28 and H29 close to complete the circuit of solenoid C13 corresponding to movements of the carrier C to the left. The corresponding friction clutches are thus operated whereby the actuator is moved upwardly on the carrier frame C towards the 38th row of counting devices N and whereby the carrier frame is moved to the left towards the 19th column of said counting devices.

As the actuator moves upwardly on the carrier frame towards the energised 38th magnet C1 thereon the armature A63 thereon successively registers with the intervening magnets C1 but these are all deenergised at this time. When, however, this armature registers with the energised magnet C1 it is attracted thereby to close the normally open contacts A67 and A70 and complete the circuit of the "vertical" locating solenoid A60 through a circuit which extends from the supply conductor 109 through conductor 118, solenoid A60, closed contacts A67 and A70, conductor 127 and closed contacts 86, 85 to earth the latter pair of contacts having been closed by the frictional drag of the relevant magnet 84 as the actuator commenced its ascending movement as hereinbefore described.

Similarly when the carrier frame C in moving to the left registers with the 19th column of counting devices N the armature C16 thereon registers with and is attracted by the energised magnet P1 to effect engagement of normally open contacts C19 and C22 thus completing the circuit of the "horizontal" locating solenoid C8. Each of these solenoids operates to project the associated locating pin whereby the actuator is locked in the required position to the carrier frame C and the latter is locked to the frame of the panel P. The actuating device A is thus in register with the required counting device N located in the 38th row of the 19th column thereof.

The locating solenoid A60 in operating closes normally open contacts A74 and A75 while similarly the locating solenoid C8 closes normally open contacts C28 and C29, such pairs of contacts being arranged in series in the circuit of the operating solenoid A5 for the hinged frame A3 of the actuating device. Thus when both pairs of said contacts are closed the solenoid A5 is energised in a circuit which extends from the supply conductor 109 by way of conductor 118 to closed contacts A74, A75 and C28, C29 in series and conductor 199 and the solenoid A5 to earth.

Thus the hinged frame A3 is swung forwardly whereby it engages the conical locating heads on the attachment screws P4 which secure the selected counting device to the panel.

When so located the "subtraction" pawls A27 on the hinged frame A3 are in operative engagement with the corresponding driving gears N7 of the selected counting device.

As the plunger A6 of the solenoid A5 moves to its operated position as above described it opens and finally recloses the normally closed contacts A13 and A16 in the common feed to the magnets S1 of the transfer unit while said movement of the plunger also closes the normally open contacts A12 and A15.

The closing of the lastmentioned contacts completes a holding circuit for the solenoid A5, such circuit being traced from supply conductor 109, conductor 110, normally closed contacts S47 and S43' of the transfer device, conductor 128 and resistance 129 to the said solenoid. Accordingly a reduced holding current passes through this lastmentioned circuit to the solenoid A5, but as the original energising circuit thereof is still closed, such current at this stage merely supplements the current previously passing through the solenoid.

As the hinged frame A3 swung forwardly to the described operative position the forward end of the push rod A45 engaged the casing of the selected counting device N if, as will be assumed, the "frozen" indicator for that counting device is disposed in its inoperative position. Thus the normally open contacts A47 and A49 are closed but the normally open contacts A48 and A51 in the circuit of the "frozen" magnet T16 remain open.

The closing of contacts A47, A49 completes the circuit of the magnet S2 which attracts its armature to release the one revolution clutch of the transfer device S, the circuit of the magnet S2 being traced from the supply conductor 109 by way of conductors 110 and 130 to the magnet S2 and through conductor 131 and closed contacts A47 and A49 to earth.

Accordingly, as previously explained, the spindle S5 of the transfer device is moved through one complete revolution during which each of the toothed pinions S17 freely mounted thereon is frictionally driven in the same direction until the coacting gear wheel S18 is arrested by the associated preset ratchet disc S24. Thus in the example under consideration the pinion S17 corresponding to the value setting lever T12 of the transmitter moves forwardly through three teeth so that the corresponding normally open contacts S35, S36 are closed and opened three times. Likewise the contacts S35 and S36 corresponding to the setting lever T13 are closed and opened seven times while the contacts corresponding to the setting lever T14 are closed and opened six times. Each pair of contacts S35, S36 is arranged in the circuit of the corresponding electromagnet A24 of the actuating device, the circuit of any one of these magnets being traced from the common supply conductor 109, through conductor 133, the winding of the relevant magnet A24 and corresponding conductor 134 to the closed contacts S35 and S36, the latter being connected to earth. As previously explained each current impulse through any of the magnets A24 of the actuating device causes the corresponding pivoted actuating arm A21 of the actuating device to undergo one forward and reverse movement.

Thus the arm A21 corresponding to the value setting lever T12 of the transmitter is operated three times and as the "subtraction" pawls A27 are at this time in operative engagement with the corresponding driving gears N7 of the selected counting device "N," the number disc N5 in the "hundreds" column is turned rearwardly through three divisions to display the numeral 6 at the inspection opening at the front of the panel while similarly the number discs N5 in the "tens" and "units" columns are turned rearwardly through 7 and 6 divisions respectively to display the numerals "5" and "6" respectively. During this movement of the "units" disc the zero indication thereon passes the inspection opening in the panel and as same is moving from the zero to the "nine" position, the corresponding contacts A39 and A40 are momentarily closed thereby completing the circuit of that magnet S1 of the transfer device which corresponds to the "tens" column of the counting device N. This circuit may be traced from the common supply conductor 109 through conductor 118, closed contacts A13 and A16, conductor 119, the winding of the relevant electromagnet S1 (corresponding to the "tens" column of the counting device N), conductor 135, and closed contacts A39, A40 (corresponding to the "units" column of the numbering device) to earth.

Consequently the ratchet disc S24 corresponding to the magnet S1 is permitted to escape one additional tooth so that the corresponding driving pinion S17 will move one additional tooth before its motion is arrested as previously described. In this way one further current impulse is supplied to the magnet A24 corresponding to the "tens" column of the numbering device, one additional movement being thereby imparted to the number disc N5 in the "tens" column so that this disc displays the value "4" at the end of the operation.

Similarly, as the lastmentioned number disc passes from the zero to the "nine" position the corresponding contacts A39 and A40 are momentarily closed to energise the magnet S1 corresponding to the "hundreds" column whereby one further movement will be imparted to the corresponding number disc N5 before the operation is completed, at which time such disc will display the numeral "5." Thus at the conclusion of the operations involved in subtracting the value 376 from the amount 0010922 originally displayed by the selected numbering device, the value displayed by the latter is 0010546.

Now as previously described the spindle S5 of the transfer device is fitted with a drum S38 bearing four switch operating projections S39, S40, S41 and S42 respectively.

Immediately after this drum S38 commences its rotation the projection S40 on the drum lifts the arm S44 whereby normally closed contacts S44′ and S48 are opened, the said arm S44 being then retained in its raised position by the energised magnet S51. As previously explained and as shown in the diagram, Figure 57, these contacts S44′ andS48 are in the circuit of the electromagnets 84 and the reversing solenoid 99 which latter operates the reversing gearing in the common drive means for the switch arm V5 and H5 respectively of the vertical and horizontal selecting devices. Consequently these switch arms are returned to their normal inoperative positions during the time that the selected counting device N is being operated as previously described.

As the switch arm V5 is disengaged from that contact V4 with which it has been in register, the corresponding magnet C1 on the carrier frame C i. e. the magnet for the 38th row of counting devices N is deenergised. Thus the contacts A67, A70 are reopened to deenergise the "vertical" locating magnet A60 on the actuating device and the circuit of which was previously traced. Thus the locating plunger A73 is withdrawn from the corresponding locating hole on the frame of the carrier C.

Similarly as the switch arm H5 is disengaged from that contact H4 with which it has been in register, the corresponding magnet P1 for the 19th column of counting devices N is deenergised whereby the contacts C19, C22 reopen to break the circuit of the "horizontal" locating magnet C8, the locating pin C9 of which is thus withdrawn from the corresponding hole in the panel frame.

Notwithstanding the withdrawal of the said locating pins A73 and C9, the actuator A remains accurately located upon the panel as the locating heads on the attachment screws P4 of the selected counting device N still project into the corresponding locating holes on the hinged frame A3 of the actuating device.

As the said locating pins A73 and C9 are withdrawn as above described, the associated contacts A74, A75 and C28, C29 are reopened. As previously explained these contacts are arranged in series in the original energising circuit of the solenoid A5 for actuating the hinged frame A3 of the actuating device. This circuit is thus broken but the solenoid A5 is still energised by the reduced "holding" current through the resistance 129 and the contacts S43′, S47 of the transfer device.

As these switch arms V5 and H5 are returning to their said normal positions they momentarily engage the intervening contacts V4 and H4 respectively thus momentarily energising the corresponding magnets C1 and P1. Thus as the switch arm V5 moves from the 38th contact to the 37th contact of the bank thereof, the magnet C1 corresponding to the 37th row of indicating devices is momentarily energised. Now, as previously explained the armature A64 on the actuating device is in register with the magnet C1 corresponding to the adjacent lower row of indicating devices. Accordingly as the magnet C1 for the 37th row is momentarily energised it attracts the armature A64 and closes the coacting normally open contacts A68 and A71 whereby the down-direction relay V35 is momentarily energised and the associated switch arm V34 is moved into circuit with the solenoid 78 for operating the "down" direction clutch in the vertical drive means for the actuator, this circuit being thus prepared for a subsequent operation of the apparatus. Similarly as the switch arm H5 momentarily engages the contact H4 corresponding to the 18th column of numbering devices, the contacts C18 and C21 are momentarily closed to energise the direction relay H35 but as the switch arm H34 is already in the corresponding position, such energisation of the magnet H35 is without effect.

Also as the said selector switch arms V5 and H5 respectively commence their return movements the contacts V28 and V29 on the corresponding abutment arm V10 and which until this time have been held closed by the stop pin V13, are reopened, because the retaining arm V15 permits the ratchet disc V11 to undergo a slight return movement. Thus the "up" direction clutch magnet 79 is deenergised to release the corresponding friction clutch which has been slipping since the actuating device was moved upwardly to the required position as previously explained.

Similarly the contacts H28 and H29 are reopened to deenergise the clutch magnet C13.

Returning now to the cam drum S38 on the spindle S5 of the transfer device it will be noted that after said drum has made approximately one quarter of a revolution the projection S42 thereon momentarily lifts the coacting switch arm S46 whereby normally open contacts S46′ and S50 are closed to momentarily energise the printing magnet T85 in the transmitter, the circuit of such magnet extending from the supply conductor 109 through conductor 110, closed contacts S46′, S50, conductor 136 and magnet T85 to earth.

The impression block T80 is thus initially moved downwards in opposition to the associated spring loaded plunger and is impelled upwardly by the latter when the magnet is deenergised to cause the order form and the inked ribbon to be pressed into contact with the type on the printing discs T70 which were moved to the requisite positions in unison with the setting levers of the transmitter as previously described.

Finally as the drum S38 is completing its aforesaid single revolution the projections S39 and S41 momentarily raise their respective coacting switch arms S43 and S45 respectively so that the normally closed pairs of contacts S43′, S47 and S45′, S49 respectively are momentarily opened.

Contacts S43′ and S47 are in the holding circuit of the solenoid A5 of the actuating device A so that this solenoid is now deenergised and the hinged frame A3 is swung rearwardly by its return spring to disengage the operated counting device N and during this return movement the contacts A47 and A49 are reopened thereby effecting deenergisation of the clutch release magnet S2 of the transfer device S.

Contacts S45′ and S49 are in the previously described circuit which contains in series the electromagnets S51 of the transfer device and T102 and T30 of the transmitter. Thus these magnets are simultaneously deenergised. Deenergisation of the magnet S51 allows the switch arms S43 and S44 to return to their normal positions, while similarly the magnet T102 of the transmitter when deenergised allows the switch arm T96 to return to its normal inoperative position whereby the contacts T100 and T98 in the circuit of the motor MC and the contacts T99 and T101 in circuit with the addition magnet A36 of the actuator are reopened. Likewise deenergisation of the magnet T30 of the transmitter allows the pivoted armature T29 to return to its normal inoperative position whereby the contacts T33, T35 and T34, T36 are reopened. Contacts T33 and T35 are in circuit of the transmitter motor MT which therefore is deenergised while contacts T34, T36 are in the circuit of the reversing solenoid 99, but this circuit was previously broken at the contacts S44′, S48 of the transfer device S as previously described.

Thus when the spindle S5 of the transfer device has completed its single revolution the whole apparatus has returned to its normal inoperative position and is ready for further operation. It is to be noted that the actuating device A remains in register with that counting device N on the panel P which has just been operated. That is to say the actuating device does not return to any special position on the panel at the conclusion of an operation but proceeds directly to the next counting device selected.

In the preceding description it has been assumed that the "frozen" stop N12 of the selected counting device N was disposed in its inoperative position. If, however, this "frozen" stop had been arranged in the operative position the push rod A45 on the actuating device would have engaged same as the hinged frame A3 was being swung forwardly. Under these circumstances the push rod would have moved rearwardly on the frame A3 through a distance sufficient to close the normally open contacts A48 and A51 as well as the normally open contacts A47 and A49. Closing of contacts A48 and A51 complete the circuit of the "frozen" magnet T16 of the transmitter so that the corresponding printing discs T86 of the transmitter printing mechanism would under the conditions described be moved to the operative position so that during the subsequent printing operation the type characters T86 on the discs T81 would be imprinted on the order form while the characters on the pre-set printing discs T70 would be prevented thereby from engaging the inked ribbon T81. Accordingly the letters F . . Z . . N, the abbreviation for "frozen" would be printed on the order form. Also, as previously explained, when the "frozen" stop N12 is disposed in its operative position it arrests the forward movement of the hinged frame A3 before the driving pawls A27 move into operative engagement with the corresponding driving gears N7 of the selected numbering device. Accordingly although these driving pawls are subsequently actuated as previously described, and in the manner determined by the corresponding value setting levers of the transmitter, such actuation is without effect upon the selected counting device N.

*Panel selecting means*

When it is desired to control more than one panel P by means of a single transmitter T the latter is provided with a panel selecting lever T2 as previously described whereby any desired panel may be selected.

Also when two or more transmitters T are required to control a single panel it is necessary to provide interlocking means which operate, when one transmitter is operatively connected to the panel, to prevent any other transmitter from being operatively connected thereto.

The diagram Fig. 58 shows the means by which these functions are performed and illustrates an installation comprising three transmitters designated T*x*, T*y* and T*z* respectively and three panels which are not shown in the diagram but which may be designated P*a*, P*b* and P*c* respectively. Associated with each transmitter is a panel discriminating unit designated D*a*, D*b* and D*c* respectively and these units may conveniently be arranged below the correspondingly identified panels in the manner shown in Figs. 2 and 4.

Each panel discriminating unit embodies three pivotally supported switch arms D1*a*, D1*b* and D1*c* respectively which are normally maintained in their upper inoperative positions by individual springs D2 and the free end of each of these arms supports a plurality of insulated resilient contact strips D3, one of the latter being provided for each conductor which is required to connect a transmitter to a panel. In order to simplify the diagram four strips D3 only are shown on each of the switch arms, though an inspection of Fig. 57 will show that in the particular apparatus therein illustrated nineteen separate conductors are required.

The necessary number of conductors collectively designated 200 are led from each transmitter to the corresponding panel discriminating unit and tappings therefrom are connected to corresponding resilient strips D3 on each of the three switch arms D1*a*, D1*b* and D1*c* therein.

Each resilient strip D3 is normally separated from a correspondingly fixed contact D4 from which conductors collectively designated 201 are led to the appropriate units of the corresponding panel as illustrated in Figure 57. Thus, for example, the conductors 201 associated with the uppermost switch arm D1*a* of each discriminating unit are connected to the mechanism of panel P*a* and so on.

When any of the pivoted switch arms of any discriminating unit is moved downwardly from its normal raised position the group of contact strips D3 thereon simultaneously engage the coacting fixed contacts D4 so that the corresponding transmitter is connected in circuit with the corresponding panel.

Each switch arm D1 is provided with three insulated contacts D6, D7 and D8 arranged below and normally engaging corresponding fixed contacts D9, D10 and D11 respectively and the circuits of which are hereafter described.

When any switch arm D1 is moved downwards to its operated position the said coacting pairs of contacts are separated and the contact D8 moves into engagement with a fixed contact D12 arranged therebelow and normally separated therefrom.

Thus if for example and as shown in Figure 58 the switch arm D1a of the discriminating unit Dc is moved downwardly the transmitter Tz is connected in circuit with the panel Pa.

As previously stated the required panel is selected at any transmitter by suitably adjusting the panel selecting lever T2 thereon. Thus in order to select panel Pa for operation by transmitter Tz the lever T2 of the latter is adjusted so that the contact arm T38 thereon engages the contact T39a corresponding to panel Pa whereby the circuit of an operating electromagnet D5 associated with the switch arm D1a of the discriminating unit Dc is prepared.

When subsequently the starting lever T1 of transmitter Tz is moved towards its operative position the said circuit is closed when an insulated contact T110 on the slide bar T26 moves into engagement with a resilient contact strip T111 secured to a fixed support on the transmitter, such engagement being effected before the starting lever T1 has moved sufficiently far to operate the armature T29 and close the contacts associated therewith. The circuit may be traced from a battery B2 by way of conductors 202 and 203 to the said contact strip T111 of transmitter Tz, contact T110, conductor 204 to the winding of a locking solenoid T112, conductor 205, contact arm T38 of the panel selecting lever T2, contact T39a, conductor 206, normally closed contacts D8 and D11 associated with the switch arm D1a of the discriminating unit Dc conductor 207, normally closed contacts D7 and D10 associated with the switch arm D1a of the discriminating unit Db, conductor 208 normally closed contacts D7 and D10 associated with switch arm D1a of the panel discriminating unit Da, conductor 210 and the winding of the operating magnet D5 for the switch arm D1a of the discriminating unit Dc to earth.

This magnet when energised attracts an armature on the associated switch arm whereby the latter is moved downwards to its operated position, as shown. Thus the group of contact strips D3 on the operated switch arm engage the corresponding fixed contacts D4 while simultaneously the pairs of contacts D6, D9; D7, D10 and D8, D11 are opened while the normally open contacts D8, D12 are closed. The opening of contacts D8, D11 momentarily interrupts the circuit of the energised operating magnet D5, but same is again energised when contacts D8 and D12 are closed; the aforesaid contacts associated with the switch arms D1a of the other discriminating units Da and Db being thus by-passed.

Although the circuit of the operating magnet D5 is interrupted when the switch arm commences to move downwards, the inertia of the moving arm causes it to complete its downward movement and again complete the circuit of the magnet as described.

From the preceding description it will be understood that the initial energising circuit of each of the operating magnets D5 includes in series, normally closed pairs of contacts associated with those switch arms D1 of all of the discriminating units D which correspond to the same panel and that when any such switch arm is moved to its operative position the said normally closed pairs of contacts associated therewith are opened.

Accordingly when any switch arm is moved towards its operated position, it is not possible to complete the circuit of the operating magnet D5 associated with the corresponding switch arm of any of the other discriminating units. Thus in Fig. 58 the setting levers T2 of the transmitters Tx and Ty are both set to select the panel Pa to which transmitter Tz is already connected as explained. It will be noted, however, if the starting levers T1 of the transmitters Tx and Ty are moved to their operative positions, the circuits of the magnets D5 for the switch arms D1a of the discriminating units Da and Db are not completed as each of these circuits is interrupted at the appropriate pair of contacts D6 and D9 or D7 and D10 associated with the switch D1a of the discriminating unit Dc.

Accordingly under the conditions shown in the diagram panel Pa cannot be selected by either of the transmitters Tx or Ty but either of the latter may select panel Pb or panel Pc.

Now the aforesaid locking solenoid T112 incorporated in each transmitter is provided with a plunger T113 which normally projects into a slot T114 in the corresponding slide bar T26 the arrangement of the slot being such that the slide bar cannot be moved forwardly through the distance necessary for operation of the armature T29 until said locking plunger is withdrawn. However, before the forward motion of the slide bar is arrested by the locking plunger, the aforesaid contact T110 thereon engages the coacting contact strip T111. Thus unless the required panel is already connected to another transmitter the aforesaid circuit which includes the solenoid T112 is completed before the locking plunger T113 arrests the forward movement of the slide bar. The solenoid T112 is thus energised to withdraw its plunger and enable the slide bar to complete its full forward movement without interruption.

Each armature T29 is for the present purpose provided with an additional contact T116 connected in circuit with the supply conductor 202 such contact being normally separated from a coacting contact T117 which is electrically connected to the contact T110 and the corresponding end of the solenoid T112. Thus when the armature T29 is moved to its operated position the said contacts T116 and T117 close to by-pass the contacts T110 and T111 whereby the circuit containing the solenoid T112 and the relevant electromagnet D5 of the associated panel discriminating unit, remains energised when the contacts T110 and T111 are reopened by the return of the slide bar T26 to its normal inoperative position.

While the mechanism as so far described operates to prevent any particular panel being selected by a transmitter when said panel is already electrically connected to another transmitter it would not prevent the simultaneous operation of two or more transmitters to select the same panel and if this were to take place a plurality of transmitters would be electrically connected to the selected panel at the same time.

Accordingly, the apparatus includes means to prevent simultaneous movements of any two or more of the starting levers T1 towards their operative positions. The particular means diagrammatically illustrated in Fig. 58 comprises a ratchet bar T118 individual to the slide bar T26 of each transmitter and pivoted at one end thereto, the free end of such bar T118 being suspended by an associated spring T119.

An electromagnet T120 is arranged below each ratchet bar and the upper end of the core T121 thereof is shaped to coact with ratchet teeth formed in the lower edge of the ratchet bar. Thus when any magnet T120 is energised the coacting ratchet bar is attracted thereby and moves downwardly in opposition to its associated spring to engage the magnet core, the associated slide bar T26 and starting lever T1 being then locked against forward movement.

Each magnet T120 is provided with two separate windings, one of which is in circuit as hereafter explained with appropriate contacts in one of the other transmitters while similarly the second winding is in circuit with contacts in the remaining transmitter.

Each starting lever T1 has a lost motion connection T122 with the coacting slide bar T26 whereby a contact T123 on the former is normally separated from a resilient strip T124 on the latter, the said contact T123 being connected by a conductor 211 to the supply line 202. As the starting lever commences to move forwardly the contact T123 thereon engages the adjacent end of the contact strip T124 and during the ensuing initial forward movement of the slide bar T26 the opposite end of the contact strip, T124, engages a resilient contact strip T125 fixed to the frame of the transmitter and such engagement is maintained until the starting lever approaches the limit of its forward movement and is then broken.

During the time that the contact members T124 and T125 are so engaged, each of the magnets T120 of the remaining transmitters are energised to prevent forward movements of the corresponding starting levers.

Thus as the lever T1 of the transmitter Tz was moving forwardly to its operated position in which it is shown in Figure 58, the contact members T124 and T125 therein were engaged thereby completing a circuit which extends from the supply line 202 by way of conductor 211 closed contacts T123, T124 and T125 in series conductor 212 and parallel branches 213 and 214 therefrom to corresponding windings of the magnets T120 of transmitters T*x* and T*y*.

If during the time that the starting lever of transmitter Tz was moving forwardly as described an attempt had been made to move the starting lever of say transmitter T*x* to its operated position, the initial movement of such starting lever would have caused the magnet T120 of transmitter Tz to be energised and additionally to complete the circuit of the second winding of the magnet T120 of transmitter T*y*. Thus all three starting levers would be temporarily prevented from moving to their operated positions.

It will thus be understood that the described interlocking means utilises that interval of time which although short must necessarily elapse while any slide bar T26 is moving forwards, to prevent simultaneous operation or two or more starting levers and thereby prevent any one panel from being simultaneously connected to two or more transmitters.

I claim:

1. Registering apparatus comprising a plurality of adjustable register devices arranged in columns and rows whereby each such register device is identifiable by the column and row containing same, an actuating device movably supported adjacent said register devices and adapted for alternative driving engagement therewith, means operable to select any required register device for operation by said actuating device, means including reversing gearing operable to move said actuating device parallel to the columns of register devices, means including reversing gearing operable to move same parallel to the rows of said register devices, means operable to arrest the actuating device in register with that column which contains the selected register device, means operable to arrest the movement of the actuating device in register with that row which contains the selected register device, direction sensing means operable to cause said actuating device, when in register with any of said register devices, to move directly towards that column which contains a subsequently selected register device, a second direction sensing means operable to cause said actuating device to move directly towards that row which contains said subsequently selected register device, and means operable when said actuating device is moved into register with a selected register device, to effect a predetermined adjustment of the latter by said actuating device, each of said direction sensing means comprising a series of electromagnets one for each column or row as the case may be of register devices, means operable when any particular register device is selected for operation to energise momentarily and in sequence all those electromagnets in each series thereof which intervene between one end of the respective series and that electromagnet which corresponds to the column or row as the case may be containing the selected register device, means operable after said selected register device has been adjusted to energise said intervening electromagnets momentarily in the reverse order and switching means operable by said electromagnets to control the respective reversing gearing, said switching means being movable in unison with said actuating device and parallel to said series of electromagnets, whereby said switching means is operated upon energisation of that particular electromagnet which occupies a predetermined position relatively to said actuating device.

2. Registering apparatus comprising a plurality of independently adjustable register devices arranged in spaced relationship, each of said register devices comprising a plurality of separately adjustable units of different denominational values, each such unit except that for the highest denomination, including "carry" means, an actuating device arranged adjacent said register devices, means operable to move said actuating device into register and coacting driving engagement with any desired register device, said actuating device comprising a plurality of electromagnetically operable driving means corresponding to the several denominational units of a register device and adapted for operative engagement therewith, and a plurality of movable "carry" members adapted to be operated by said "carry" means of the corresponding denominational units at predetermined positions of the latter, transfer means operable to effect operation of said actuating device when same is in driving engagement with a register device and thereby adjust the latter, remote control means operable to select any required register device and to control said transfer means to predetermine the adjustment of said selected register device, said transfer device comprising a plurality of angularly movable escapement members, one for each of said denominational units of a register device, an angularly movable switch control member associated with each escapement member, resilient means individual to each coacting pair of escapement and switch control members and urging same in opposite directions, means normally preventing movement of either member by said resilient means, electromagnetically controlled means individual to each escapement member and operable to permit controlled movements of said escapement member by the associated resilient means, driving means including friction clutches operable when said actuating device is operatively engaged with a selected register device to move said switch control members forwardly in the direction of movement of said escapement members and to the extent permitted by any prior adjustment of the latter, switch means individual to each switch control member and arranged to control the corresponding electromagnetic driving means in the actuating device, such switch means being arranged to be intermittently closed and opened during forward movements of said switch control member, the number of such switch operations being dependent on the magnitude of said forward movement of the corresponding escapement member, and means operatively connecting each of said movable "carry" members of the actuating device to said electromagnetically controlled means for that escapement member of the transfer device which corresponds to the denominational unit of next higher value.

3. Registering apparatus comprising a series of individually adjustable register devices arranged side by side, actuating means movably supported adjacent said register devices, means including reversing gearing operable to move said actuating means over said series of register devices and into register and coacting driving engagement with any one of such register devices, a series of electromagnets one for each of said register devices and disposed in corresponding positions, a first magnetically operable switch means movable in unison with said actuating means, such switch means being disposed in operative relationship with the corresponding electromagnet when said actuating means is in register with any one of said register devices, means operable to energise any one of said electromagnets to select the corresponding register device, means operable before one of said electromagnets is energised to select a particular register device, to energise momentarily and in sequence all those electromagnets which intervene between it and one end of the series thereof, said means being also operable to energise momentarily and in the reverse order all such intervening electromagnets after the selected register device has been adjusted, two additional magnetically operable switch means movable in unison with said first switch means and disposed one at each side thereof, whereby said additional switch means are disposed in operative relationship with the electromagnets corresponding to those register devices disposed on opposite sides of any register device for the time being in register with said actuating means, means controlled by said additional switch means for controlling said reversing gearing whereby said actuating means will be caused to move in the required direction towards any selected register device, locking means controlled by said first switch means and adapted to lock said actuating means in register with the selected register device, means operable when said actuating means is in driving engagement with any one of said register devices to operate said actuating means to effect adjustment of said register device, and remote control means for said actuating means, said remote control means including means operable to select a required register device and means operable to control the adjustment of such selected register device by said actuating means.

4. Registering apparatus comprising a plurality of independently adjustable register devices arranged in spaced relationship, a plurality of separately adjustable elements of different denominational values in each of said register devices, such adjustable elements being movable in opposite directions for addition and subtraction operations, an actuator device movably supported adjacent said register devices, a plurality of driving means in said actuator device for operative engagement with the corresponding denominational elements of each of said register devices, such driving means comprising an "addition" pawl adapted for driving engagement with the corresponding denominational element and a "subtraction" pawl similarly adapted, means operable to move either said addition pawl or said subtraction pawl to an operative position, and simultaneously to move the other pawl to an inoperative position, means operable to select any particular register device for operation, actuator displacing means operable to move said actuator device into register with any selected register device, means operable to effect coacting driving engagement between said register driving means of the actuator device and the corresponding denominational elements of a register device so selected, transfer means operable to effect a temporary record of numerical values to be registered by said selected register device, means operable to actuate said transfer means to record required numerical values therein, and means operable when said actuating device is operatively engaged with said selected register device to effect operation of said transfer device, whereby said register operating means are actuated to impart to the corresponding denominational elements of the selected register device, movements of addition or subtraction corresponding to the numerical value previously recorded by said transfer means.

HENRY GEORGE WATSON.

REFERENCES CITED

The following references are of record in the file of this patent:

UNITED STATES PATENTS

| Number | Name | Date |
|---|---|---|
| 1,138,089 | Crumpton | May 4, 1915 |
| 1,911,863 | Webner | May 30, 1933 |
| 2,339,666 | Anderson | Jan. 18, 1944 |

FOREIGN PATENTS

| Number | Country | Date |
|---|---|---|
| 270,044 | Great Britain | May 6, 1927 |
| 331,182 | Great Britain | June 24, 1930 |
| 533,586 | Great Britain | Feb. 17, 1941 |
| 502,371 | Germany | July 16, 1930 |